US012595702B2

(12) United States Patent
Lopez

(10) Patent No.: US 12,595,702 B2
(45) Date of Patent: Apr. 7, 2026

(54) LADDER AND ACCESSORY FOR A LADDER

(71) Applicant: Werner Co., Itasca, IL (US)

(72) Inventor: Ivan D. Lopez, Hermitage, PA (US)

(73) Assignee: Werner Co., Greenville, PA (US)

(*) Notice: Subject to any disclaimer, the term of this patent is extended or adjusted under 35 U.S.C. 154(b) by 1012 days.

(21) Appl. No.: 17/497,759

(22) Filed: Oct. 8, 2021

(65) Prior Publication Data

US 2022/0112768 A1 Apr. 14, 2022

Related U.S. Application Data

(60) Provisional application No. 63/091,742, filed on Oct. 14, 2020.

(51) Int. Cl.

| | |
|---|---|
| ***E06C 7/18*** | (2006.01) |
| ***E06C 5/02*** | (2006.01) |
| ***E06C 7/48*** | (2006.01) |
| *E06C 1/04* | (2006.01) |

(52) U.S. Cl.

CPC ................ *E06C 7/182* (2013.01); *E06C 5/02* (2013.01); *E06C 7/183* (2013.01); *E06C 7/48* (2013.01); *E06C 1/04* (2013.01)

(58) Field of Classification Search

CPC ... E06C 7/182; E06C 1/04; E06C 7/48; E06C 7/183; E06C 5/02

USPC .......................................................... 182/106

See application file for complete search history.

(56) References Cited

U.S. PATENT DOCUMENTS

| | | | | | |
|---|---|---|---|---|---|
| 2,140,828 | A * | 12/1938 | Carle | E06C 1/36 | 248/214 |
| 2,881,028 | A * | 4/1959 | Baird | E06C 7/16 | 182/120 |
| 2,883,134 | A * | 4/1959 | O'Halloran | E06C 7/14 | 248/210 |
| 3,828,889 | A * | 8/1974 | Rehm | E06C 1/36 | 182/206 |
| 4,502,566 | A * | 3/1985 | Wing | E06C 7/48 | 182/214 |

(Continued)

FOREIGN PATENT DOCUMENTS

| | | | |
|---|---|---|---|
| AU | 2019101362 | A4 | 12/2019 |
| CA | 3134142 | | 12/2023 |

(Continued)

OTHER PUBLICATIONS

CIPO: Application No. 3,134,142; Office Action dated Dec. 21, 2022, 5 pages.

(Continued)

*Primary Examiner* — Brent W Herring

(74) *Attorney, Agent, or Firm* — Fitch, Even, Tabin & Flannery LLP

(57) ABSTRACT

An accessory for a ladder rail with a rung having a housing to be removably and fixedly attached to the rail. The accessory having an elongate member attached to the housing and extending beyond the housing. The accessory having a first locking assembly attached to the housing having a lock state which locks the housing to the rail, and an unlocked state which unlocks the housing from the rail so the housing is able to be removed from the rail. A method for attaching an accessory to a ladder rail with a rung. A ladder having an accessory for leaning against an edge, such as a roof.

22 Claims, 24 Drawing Sheets

(56) References Cited

U.S. PATENT DOCUMENTS

| | | | | |
|---|---|---|---|---|
| 5,080,192 | A | 1/1992 | Kerr | |
| 5,261,507 | A * | 11/1993 | Williams | E06C 7/48 182/229 |
| 5,638,916 | A * | 6/1997 | Schneider | E06C 1/34 182/116 |
| 5,743,356 | A * | 4/1998 | Mitchell | E06C 7/48 182/229 |
| 6,347,685 | B1 | 2/2002 | Ellis | |
| 7,077,239 | B1 | 7/2006 | Hayman | |
| 9,169,693 | B2 | 10/2015 | Honeycutt | |
| 10,100,576 | B1 | 10/2018 | Dimovski | |
| 10,883,310 | B2 * | 1/2021 | Johnson | E06C 7/48 |
| 2002/0108811 | A1 * | 8/2002 | Ulmschneider | E06C 7/482 182/206 |
| 2003/0098201 | A1 | 5/2003 | Ellis | |
| 2005/0023084 | A1 * | 2/2005 | Lazarus | E06C 7/482 182/214 |
| 2005/0189173 | A1 | 9/2005 | Becker | |
| 2005/0220917 | A1 | 10/2005 | Pierik | |
| 2008/0190692 | A1 * | 8/2008 | Feik | E06C 7/182 182/107 |
| 2010/0031573 | A1 | 2/2010 | Whiting | |
| 2012/0097481 | A1 * | 4/2012 | Schienke | E06C 1/06 182/107 |
| 2013/0186710 | A1 | 7/2013 | Moss | |
| 2013/0340353 | A1 | 12/2013 | Whiting | |
| 2015/0135604 | A1 | 5/2015 | Whiting | |
| 2016/0138338 | A1 | 5/2016 | Olson | |
| 2016/0215563 | A1 | 7/2016 | Ellis | |
| 2017/0226803 | A1 | 8/2017 | Russell | |
| 2017/0321452 | A1 | 11/2017 | Whiting | |
| 2018/0258698 | A1 * | 9/2018 | Minock | E06C 7/482 |
| 2019/0078385 | A1 | 3/2019 | Moss | |
| 2020/0248507 | A1 | 8/2020 | Moss | |
| 2022/0112768 | A1 | 4/2022 | Lopez | |
| 2023/0048647 | A1 * | 2/2023 | MacKarvich | E06C 7/486 |
| 2023/0167683 | A1 | 6/2023 | Lopez | |

FOREIGN PATENT DOCUMENTS

| | | | |
|---|---|---|---|
| CN | 206376736 | | 8/2017 |
| CN | 113250599 | A | 8/2021 |
| EP | 3015640 | A1 | 5/2016 |
| EP | 3816391 | A1 | 5/2021 |
| EP | 3940189 | A1 | 1/2022 |
| EP | 4148203 | A1 | 3/2023 |
| EP | 4467749 | A1 | 11/2024 |
| FR | 3023571 | | 1/2016 |
| FR | 3113695 | A1 | 3/2022 |
| GB | 200227 | | 7/1923 |
| GB | 2484706 | A | 4/2012 |
| KR | 20120008002 | A | 1/2012 |
| KR | 20120008002 | | 11/2012 |
| KR | 20200098033 | A | 8/2020 |
| NL | 1011205 | C1 | 8/2000 |
| WO | 2008110812 | A1 | 9/2008 |

OTHER PUBLICATIONS

CIPO: Application No. 3,134,142; Notice of Allowance dated Oct. 23, 2023, 1 page.

Extended European Search Report issued in App. No. EP24154295, dated Jul. 1, 2024, 8 pages.

* cited by examiner

DETAIL B
SCALE 1 : 4

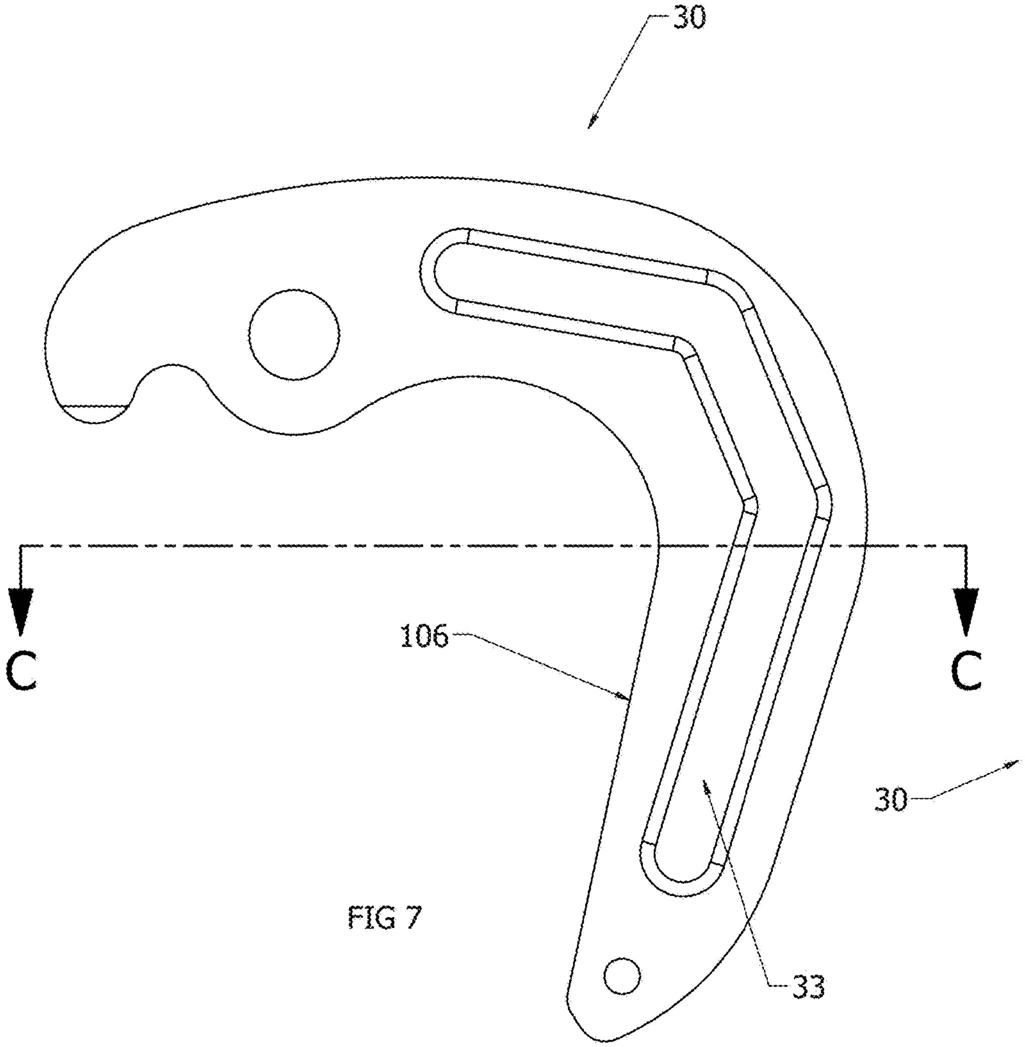
FIG 7
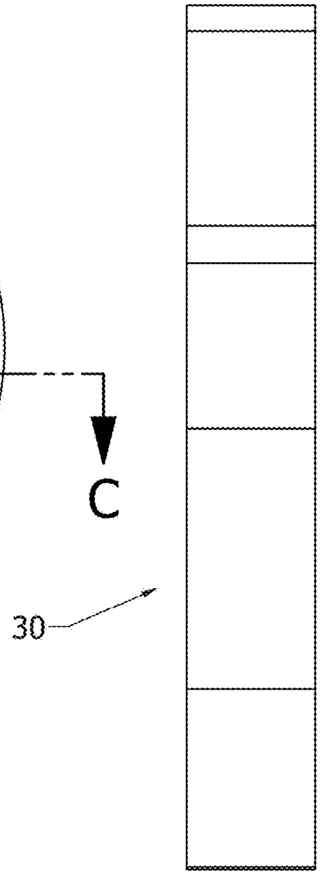
FIG 8
FIG 9
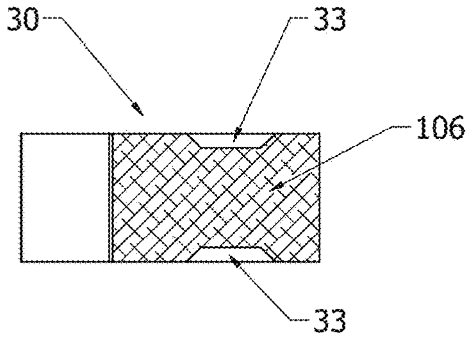
SECTION C-C

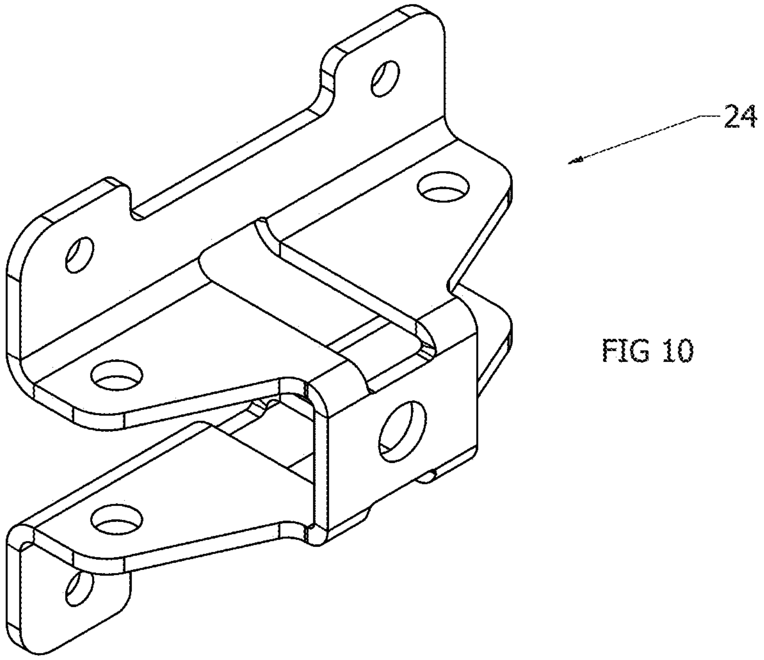
FIG 10
FIG 11
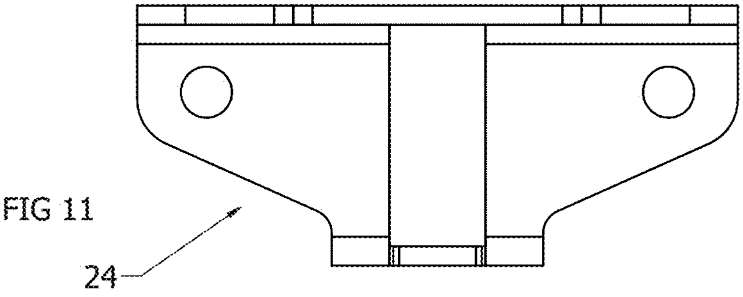
FIG 12
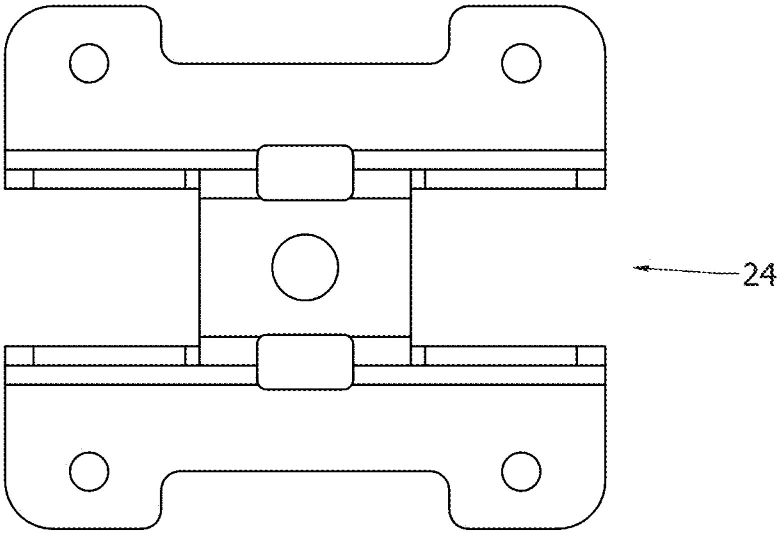

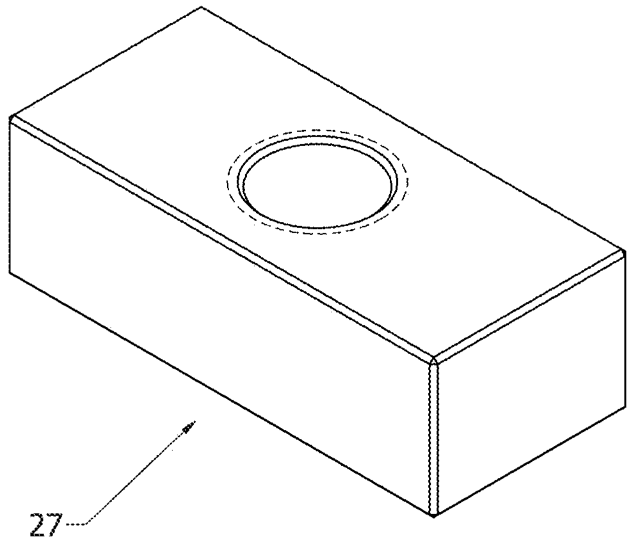
FIG 16
FIG 17
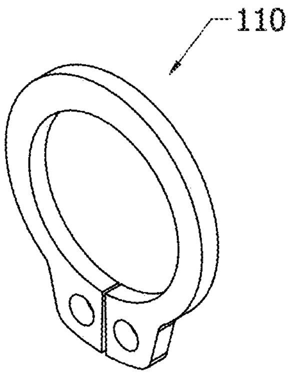
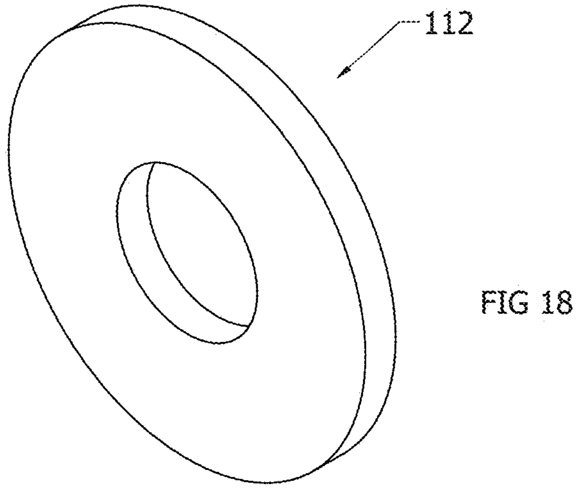
FIG 18

SECTION D-D

FIG 28
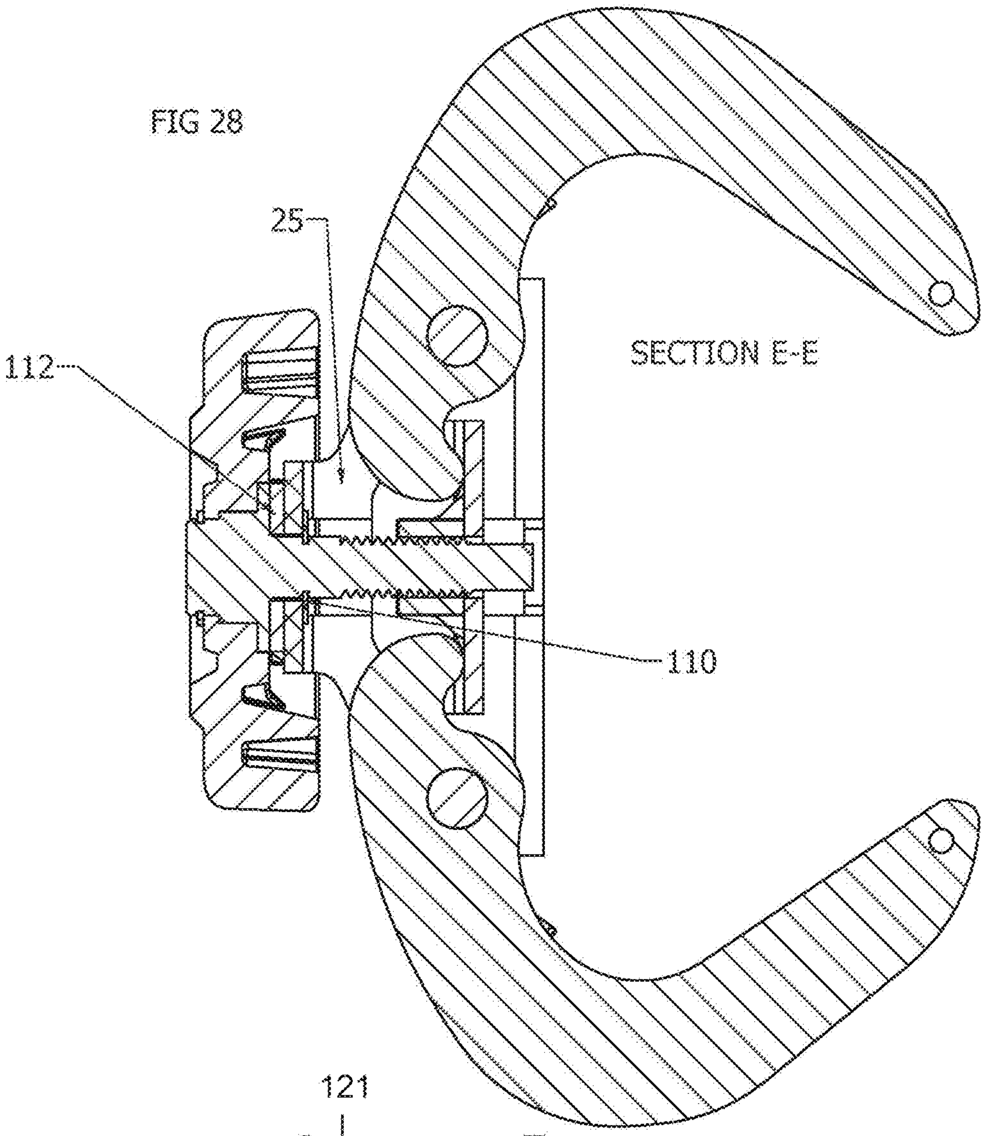
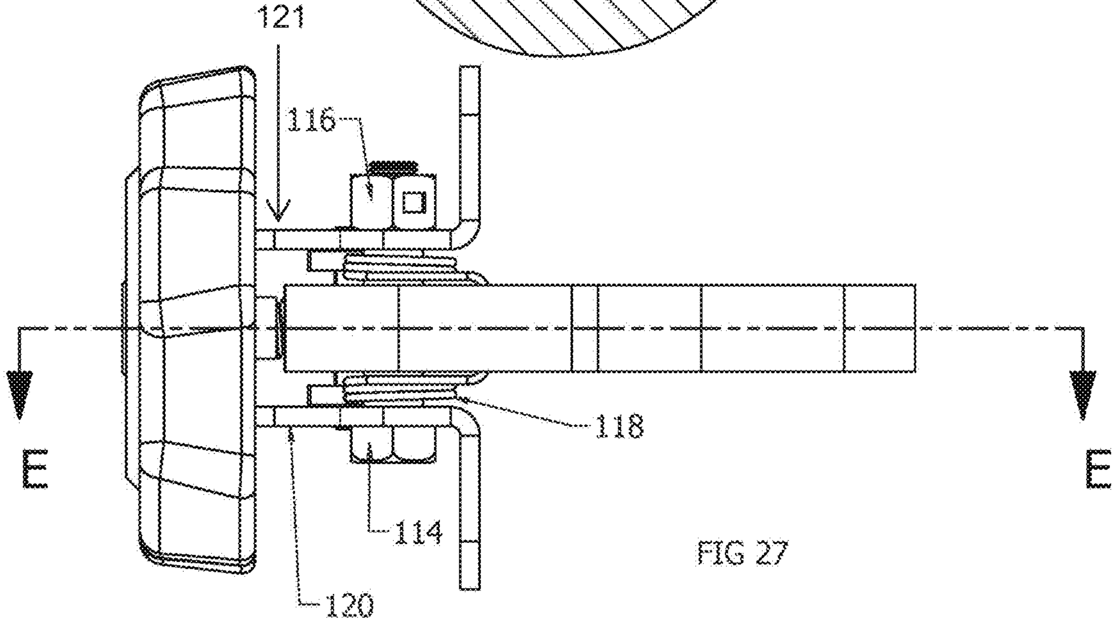
FIG 27

LADDER AND ACCESSORY FOR A LADDER

CROSS-REFERENCE TO RELATED APPLICATIONS

This is a nonprovisional of U.S. provisional application Ser. No. 63/091,742 filed Oct. 14, 2020, incorporated by reference herein.

FIELD OF THE INVENTION

The present invention is related to an accessory for a ladder which fixedly and removably attaches to a rail of the ladder by rotating a knob of a locking assembly of the accessory. (As used herein, references to the "present invention" or "invention" relate to exemplary embodiments and not necessarily to every embodiment encompassed by the appended claims.) More specifically, the present invention is related to an accessory for a ladder which fixedly and removably attaches to a rail of the ladder by rotating a knob of a locking assembly of the accessory which causes jaws of the locking assembly which are engaged with the knob to together clamp and lock the accessory to the rail.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Ladders are used in a multitude of locations. In some of these locations, accessories are attached to the ladder to better conform the ladder to the location so the ladder with the accessory better assists a user to perform his or her task, or makes it safer for the user to perform his or her task, or both. In this way, a standard ladder can be adapted for many different tasks many different locations by simply attaching the accessory to the ladder. Consequently, this dictates a need for an accessory to be safely and securely attached to the ladder and to be removed from the ladder as easily and quickly as possible without damaging the ladder.

BRIEF SUMMARY OF THE INVENTION

The present invention pertains to an accessory for a ladder rail with a rung. The accessory comprises a housing to be removably and fixedly attached to the rail. The accessory comprises an elongate member attached to the housing and extending beyond the housing. The accessory comprises a first locking assembly attached to the housing having a lock state which locks the housing to the rail, and an unlocked state which unlocks the housing from the rail so the housing is able to be removed from the rail.

The present invention pertains to a ladder. The ladder comprises a first rail. The ladder comprises a second rail in parallel and spaced relation with the first rail. The ladder comprises a rung attached to the first and second rails. The ladder comprises a first housing removably and fixedly attached to the first rail. The ladder comprises a second housing removably and fixedly attached to the second rail. The ladder comprises a first elongate member attached to the first housing and extending beyond the first housing. The ladder comprises a second elongate member attached to the second housing and extending beyond the second housing. The ladder comprises a first locking assembly attached to the first housing having a lock state which locks the first housing to the first rail, and an unlocked state which unlocks the first housing from the first rail so the first housing is able to be removed from the first rail. The ladder comprises a second locking assembly attached to the second housing having a lock state which locks the second housing to the second rail, and an unlocked state which unlocks the second housing from the second rail so the second housing is able to be removed from the second rail.

The present invention pertains to a method for attaching an accessory to a ladder rail with a rung. The method comprises the steps of placing a housing onto an end of the rail. The housing having an elongate member attached to the housing and extending beyond the housing. There is the step of rotating a first knob to cause a first jaw and a second jaw to directly contact and clamp and lock the housing to the rail. The first and second jaws engaged with the knob. The first and second jaws and the knob are part of a first locking assembly. The first locking assembly having a first bracket which attaches to the housing to fixedly attach the first locking assembly to the housing.

BRIEF DESCRIPTION OF THE SEVERAL VIEWS OF THE DRAWING

In the accompanying drawings, the preferred embodiment of the invention and preferred methods of practicing the invention are illustrated in which:

FIG. 7 is a side view of a jaw.

FIG. 8 is a front view of a jaw.

FIG. 9 shows a gnarled surface of the jaw.

FIG. 10 is a perspective view of a bracket.

FIG. 11 is a side view of the bracket.

FIG. 12 is a bottom view of the bracket.

FIG. 16 is a perspective view of a square nut of the locking assembly which fits onto the lift bracket and through which a stem of the knob extends.

FIG. 17 is a perspective view of a retaining ring of the locking assembly.

FIG. 18 is a perspective view of a nylon flat washer of the locking assembly.

FIG. 27 is a front view of the locking assembly.

FIG. 28 is a cross-sectional view of the locking assembly of FIG. 27.

FIG. 29 is a side view of an elongate member which is an arm of a walk through.

DETAILED DESCRIPTION OF THE INVENTION

Figure 1B:
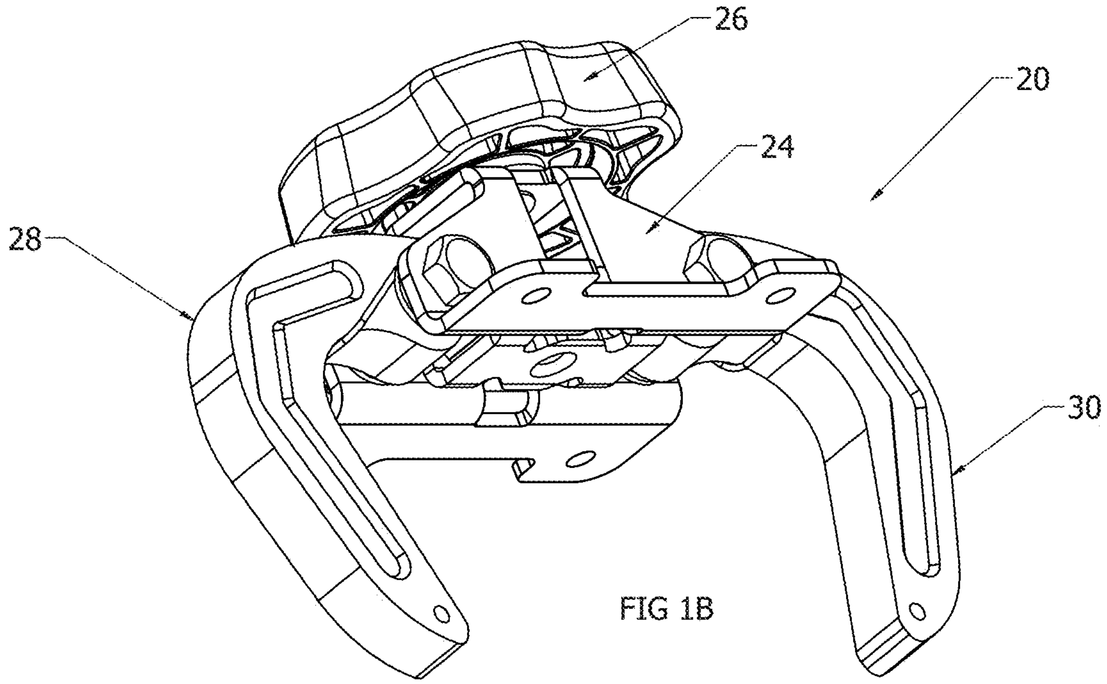
FIGS. 1A and 1B show the clamp formed from the first and second jaws in the open position.

Referring now to the drawings wherein like reference numerals refer to similar or identical parts throughout the several views, and more specifically to FIGS. 1A-5B thereof, there is shown an accessory 10 for a ladder rail 12 with a rung 14. The accessory 10 comprises a housing 16 to be removably and fixedly attached to the rail 12. The accessory 10 comprises an elongate member 18 attached to the housing 16 and extending beyond the housing 16. The accessory 10 comprises a first locking assembly 20 attached to the housing 16 having a lock state which locks the housing 16 to the rail 12, and an unlocked state which unlocks the housing 16 from the rail 12 so the housing 16 is able to be removed from the rail 12.

The housing 16 may have a rung slot 22 which allows the housing 16 to fit on the rail 12 over the rung 14. The rung slot 22 may be positioned on the inside of the housing 16.

The first locking assembly 20 may have a first bracket 24 which attaches to the housing 16 to fixedly attach the first locking assembly 20 to the housing 16. The first locking assembly 20 may have a first knob 26, and a first jaw 28 and a second jaw 30 which are engaged with the knob 26 and the rail 12. Rotation of the knob 26 causes the first and second jaws 28, 30 to together clamp the rail 12 and place the first locking assembly 20 into a locked state, or causes the first and second jaws 28, 30 to separate from the rail 12 and place the first locking assembly 20 into the unlocked state. Preferably, rotation of the knob 26 in a first direction tightens the first and second jaws 28, 30 together and creates a clamp, and rotation of the knob 26 in a second direction, opposite the first direction loosens the first and second jaws 28, 30 so the housing 16 may be lifted off of the rail 12 and removed.

The housing 16 may have a first jaw slot 32 and a second jaw slot 34. The first jaw 28 positioned over the first jaw slot 32 and the second jaw 30 positioned over the second jaw slot 34 when the first locking assembly 20 is in the locked state. The first and second jaws 28, 30 together directly contact the rail through the first and second jaw slots 32, 34 and clamp the housing 16 to the rail 12. The separate first jaw slot 32 and second jaw slot 34, may be one continuous slot or have a septum 64 between them on the outside and the inside of the housing 16. The first bracket 24 may be screwed, bolted or riveted to the outside of the housing 16 between the first and second jaw slots 32, 34. The holes 66 are where the fasteners are positioned to fix a locking assembly to a rail.

The cross-section of the housing 16 may be rectangular shaped and hollow and has a perimeter which is greater than a perimeter of a cross-section of the rail 12 so the housing 16 fits about the rail 12. With the housing 16 having a rectangular shape, the rail 12 can have a rectangular shaped cross-section, such as in a box rail, or a C-shaped cross-section. In each instance, the rectangular shaped cross-section of the housing 16 will envelop the top end of the rail and provide a secure base for the first and second jaws 28, 30 which together may clamp the housing 16 to the rail 12 and place the first locking assembly 20 into the locked state. The inner circumference of the housing 16 does not have to tightly conform to the outer circumference of the rail 12, because it is the first and second jaws 28, 30 which actually clamp the housing 16 to the rail 12. By the rail 12 having either a rectangular shaped cross-section or a C-shaped cross-section, there are at least two opposing sides of the rail against which the first and second jaws 28, 30 clamp. The accessory 10 works with most Werner ladder models, such as most Werner 1AA Extension ladder models. The housing 16 may have a cover 68 which fits over the top of the first ladder rail 12.

The housing 16 may have a third jaw slot 36 and a fourth jaw slot 38, and may include a second locking assembly 40 which has a second knob 42, and a third jaw 44 and a fourth jaw 46 which are engaged with the second knob 42 and the rail. Rotation of the second knob 42 causes the third and fourth jaws 44, 46 together to clamp to the rail 12 and place the second locking assembly 40 into a locked state, or causes the third and fourth jaws 44, 46 to separate from the rail and place the second locking assembly 40 into the unlocked state. The third jaw 44 positioned over the third jaw slot 36 and the fourth jaw 46 positioned over the fourth jaw slot 38. When the second locking assembly 40 is in the locked state, the third and fourth jaws 44, 46 together directly contact the rail through the third and fourth jaw slots 36, 38 and form a clamp to clamp the housing 16 to the rail 12. The second locking assembly 40 is disposed below the first locking assembly 20 when the housing 16 is disposed on the rail 12. The housing 16 may be made of metal, such as aluminum. The second locking assembly 40 is like the first locking assembly 20 but is attached between the third and fourth jaw slots 36, 38 on the outside of the housing 16. There may be a septum 64 between the third and fourth jaw slots 36, 38 on the outside of the housing 16. The first bracket 24 may be positioned on the septum 64 between the first and second jaw slots 32, 34 on the outside of the housing 16, and the second bracket 70 may be positioned on the septum 64 between the third and fourth jaw slots 36, 38 on the outside of the housing 16. The rung slot 22 may be disposed below the first and second jaw slots 32, 34 and extend to the bottom of the housing 16 so the housing 16 can fit onto the first rung 14.

Figure 30:
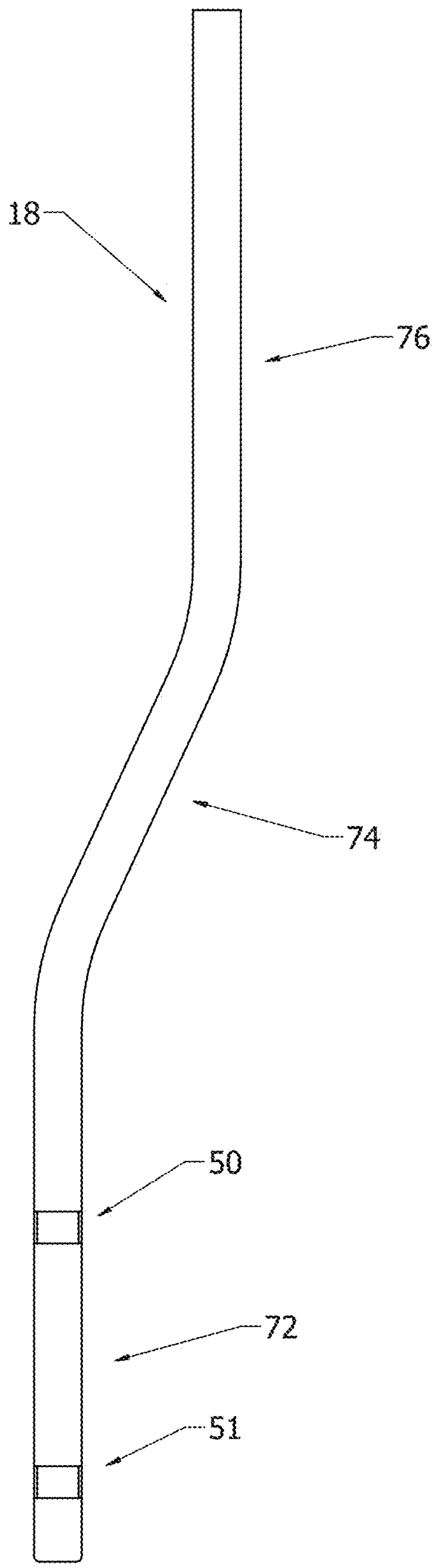
FIG. 30 is a front view of a right-hand arm of the walk through. The left-hand arm is a mirror image of the right-hand arm.

The elongate member 18 may be a first ladder grip 48 for a walk through. The first ladder grip 48 angles outwards away from the ladder as it extends upwards from the housing 16. The first ladder grip 48 comprises a first section 72 which attaches to the side of the housing 16, a second section 74 which connects to and extends from the first section 72 and angles outwards away from the ladder between 20° and 60° and a third section 76 which connects to and extends from the second section 74, as shown in FIG. 30. The first, second and third sections may each be straight, may be one continuous piece and made of metal, such as aluminum. The first ladder grip 48 may be hollow. There may be a second ladder grip 78 for a walk through, identical to the first ladder grip 48 for a walk through, which attaches to a second rail 80 of the ladder 100.

The elongate member 18 may have a first elongate slot 50 which aligns with the first jaw slot 32 through which the first jaw 28 extends to contact the rail 12. The elongate member 18 may have a second elongate slot which aligns with the third jaw slot 36 through which the third jaw 44 extends to contact the rail 12. The housing 16 may have a handle 52. The handle 52 may be attached with screws or rivets to the housing 16. The housing 16 may have a latch 54 which is positioned under the rung 14 when the housing 16 is disposed on the rail 12 which prevents the housing 16 from slipping off the rail 12.

Figure 57:
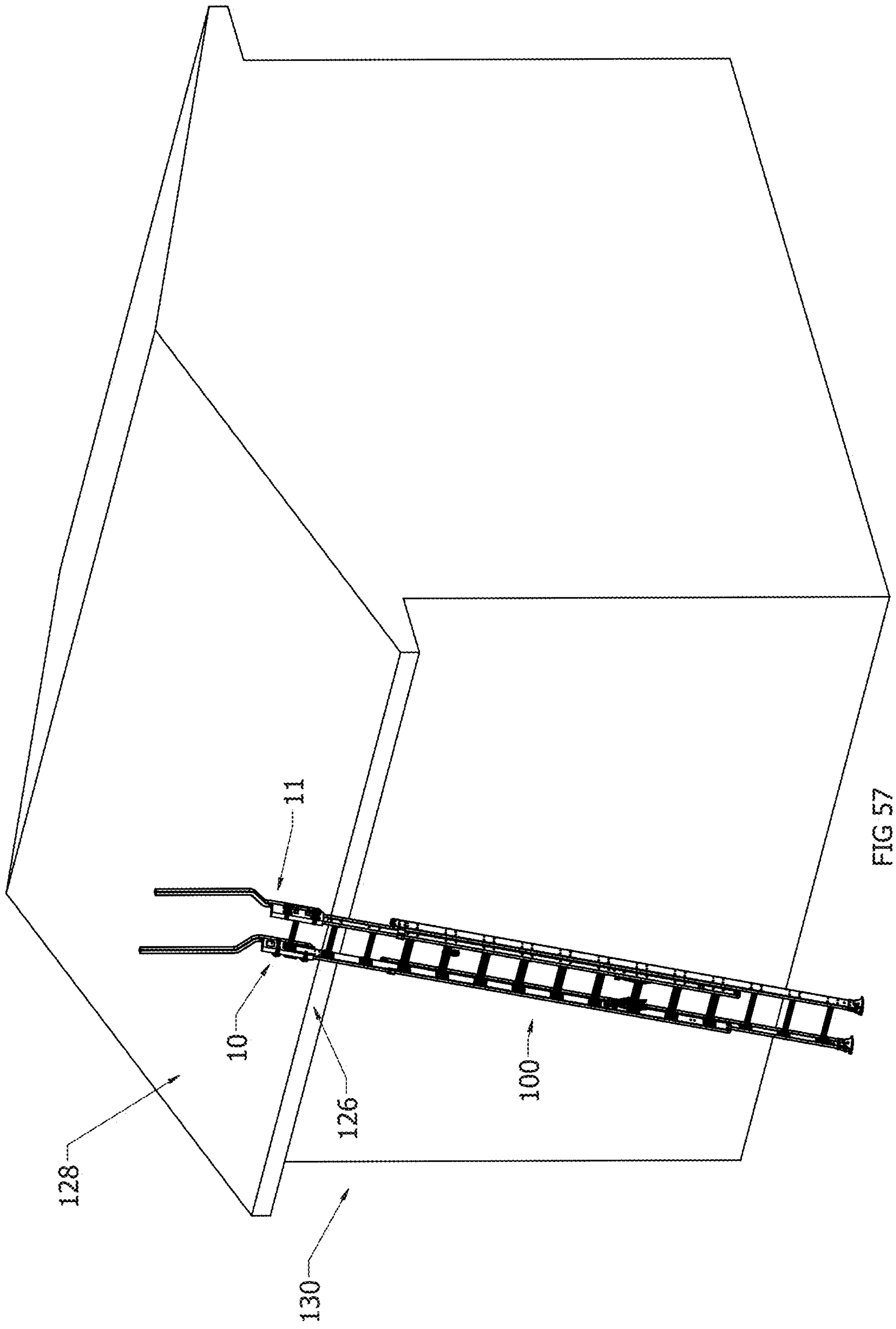
FIG. 57 shows the ladder with the accessories leaning against an edge.

The present invention pertains to a ladder 100, as shown in FIG. 57. The ladder 100 comprises a first rail 12. The ladder 100 comprises a second rail 80 in parallel and spaced relation with the first rail 12. The ladder 100 comprises a rung 14 attached to the first and second rails. The ladder 100 comprises a first housing 16 removably and fixedly attached to the first rail 12. The ladder 100 comprises a second housing 102 removably and fixedly attached to the second rail 80. The ladder 100 comprises a first elongate member 18 attached to the first housing 16 and extending beyond the first housing 16. The ladder comprises a second elongate member 104 attached to the second housing 102 and extending beyond the second housing 102. The ladder 100 comprises a first locking assembly 20 attached to the first housing 16 having a lock state which locks the first housing 16 to the first rail 12, and an unlocked state which unlocks the first housing 16 from the first rail 12 so the first housing 16 is able to be removed from the first rail 12. The ladder 100 comprises a second locking assembly 40 attached to the first housing 16 having a lock state which locks the first housing 16 to the first rail 12, and an unlocked state which unlocks the first housing 16 from the first rail 12 so the first housing 16 is able to be removed from the first rail 12. The ladder 100 comprises a second locking assembly 40 attached to the second housing 102 having a lock state which locks the second housing 102 to the second rail 80, and an unlocked state which unlocks the second housing 102 from the second rail 80 so the second housing 102 is able to be removed from the second rail 80. As shown in FIG. 57, the first and second rails of the ladder 100 are disposed against the edge 126 of the roof 128 of a building 130. The first and second accessories, attached to the top ends of the first and second rails, extend well above the roof 128. Elongate members of the accessories provide handles for a user to grip to provide support as the user steps off the ladder 100 to the roof 128.

The present invention pertains to a method for attaching an accessory 10 to a ladder rail 12 with a rung 14. The method comprises the steps of placing a housing 16 onto an end of the rail 12. The housing 16 having an elongate member 18 attached to the housing 16 and extending beyond the housing 16. There is the step of rotating a first knob 26 to cause a first jaw 28 and a second jaw 30 to directly contact and clamp and lock the housing 16 to the rail 12. The first and second jaws 28, 30 engaged with the knob 26. The first and second jaws 28, 30 and the knob 26 are part of a first locking assembly 20. The first locking assembly 20 having a first bracket 24 which attaches to the housing 16 to fixedly attach the first locking assembly 20 to the housing 16.

In one embodiment, where a first accessory 10 and a second accessory 11 are used, where each accessory has a ladder grip as an elongate member, the first and second accessories together serve as an over-the-rail extension accessory that uses a multi-point clamping system that easily and securely holds the first and second accessories to the ladder 100. Each locking assembly effectively eliminates movement or play in all directions. The oversized knob and lift bracket geometry allow the clamp formed by the first and second jaws 28, 30 to apply the necessary clamping force without damaging the rail 12 of the ladder 100. The same applies for the third and fourth jaws 44, 46 and for the second accessory 11, which is disposed on the second rail 80 of the ladder 100.

Figure 1A:
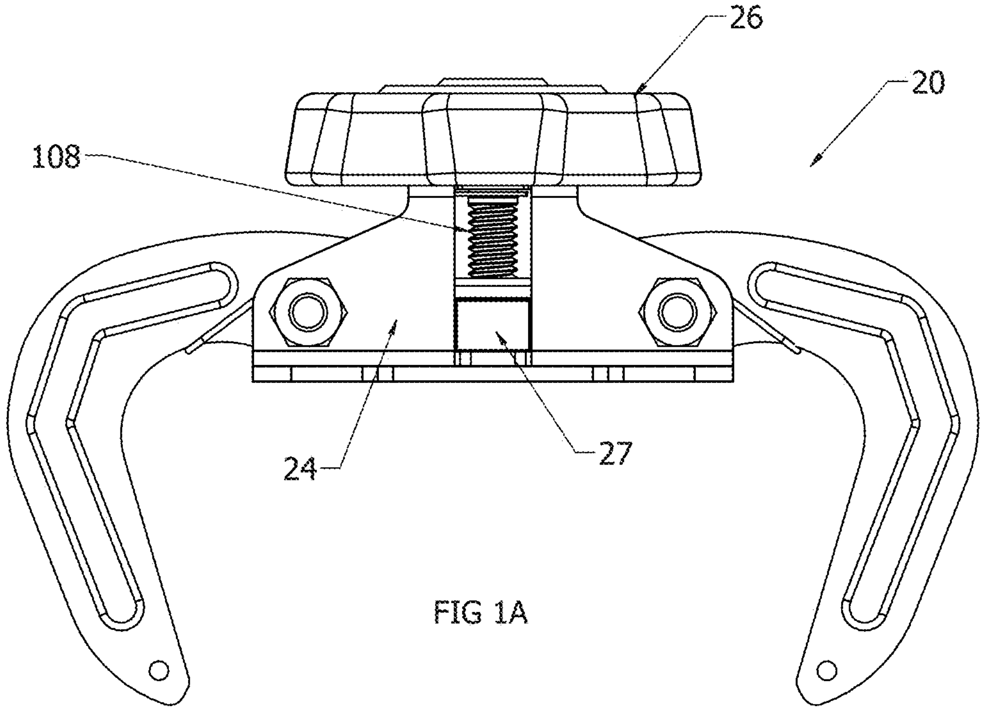

FIGS. 1A and 1B show the clamp formed from the first and second jaws 28, 30 in the open position. Key operative components are the knob and jaws.

Figure 2B:
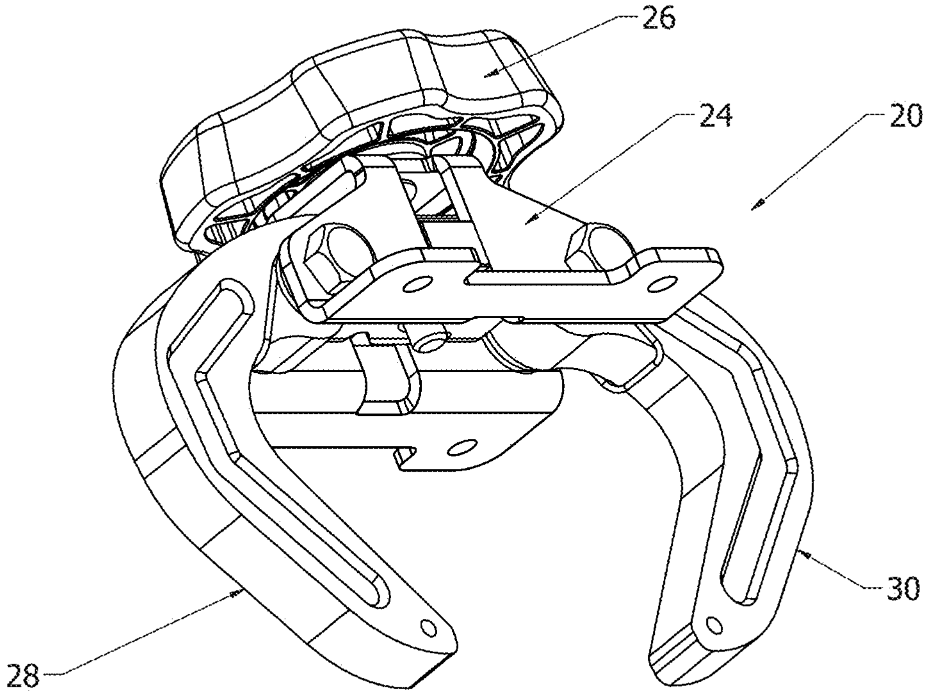
FIGS. 2A and 2B the clamp formed from the first and second jaws after the knob has been turned clockwise and the jaws have moved closer together.
Figure 2A:
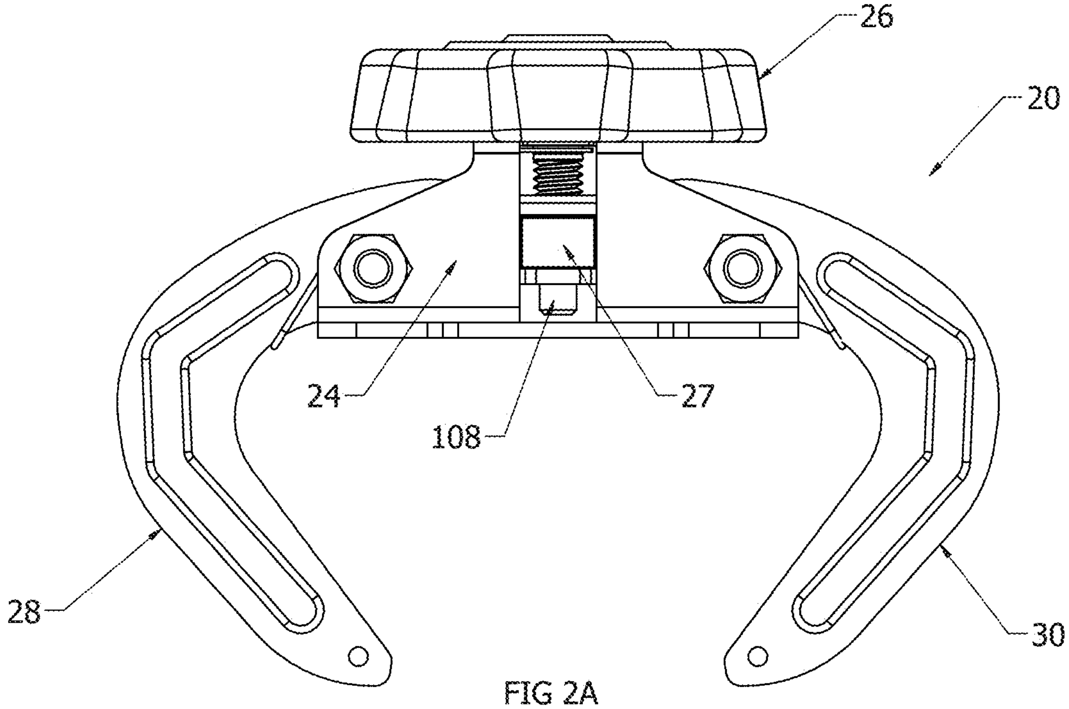

FIGS. 2A and 2B show the clamp formed from the first and second jaws 28, 30 after the knob has been turned clockwise and the jaws have moved closer together. When installed on a ladder, the jaws would be tightly gripping the ladder rail 12.

Figure 3:
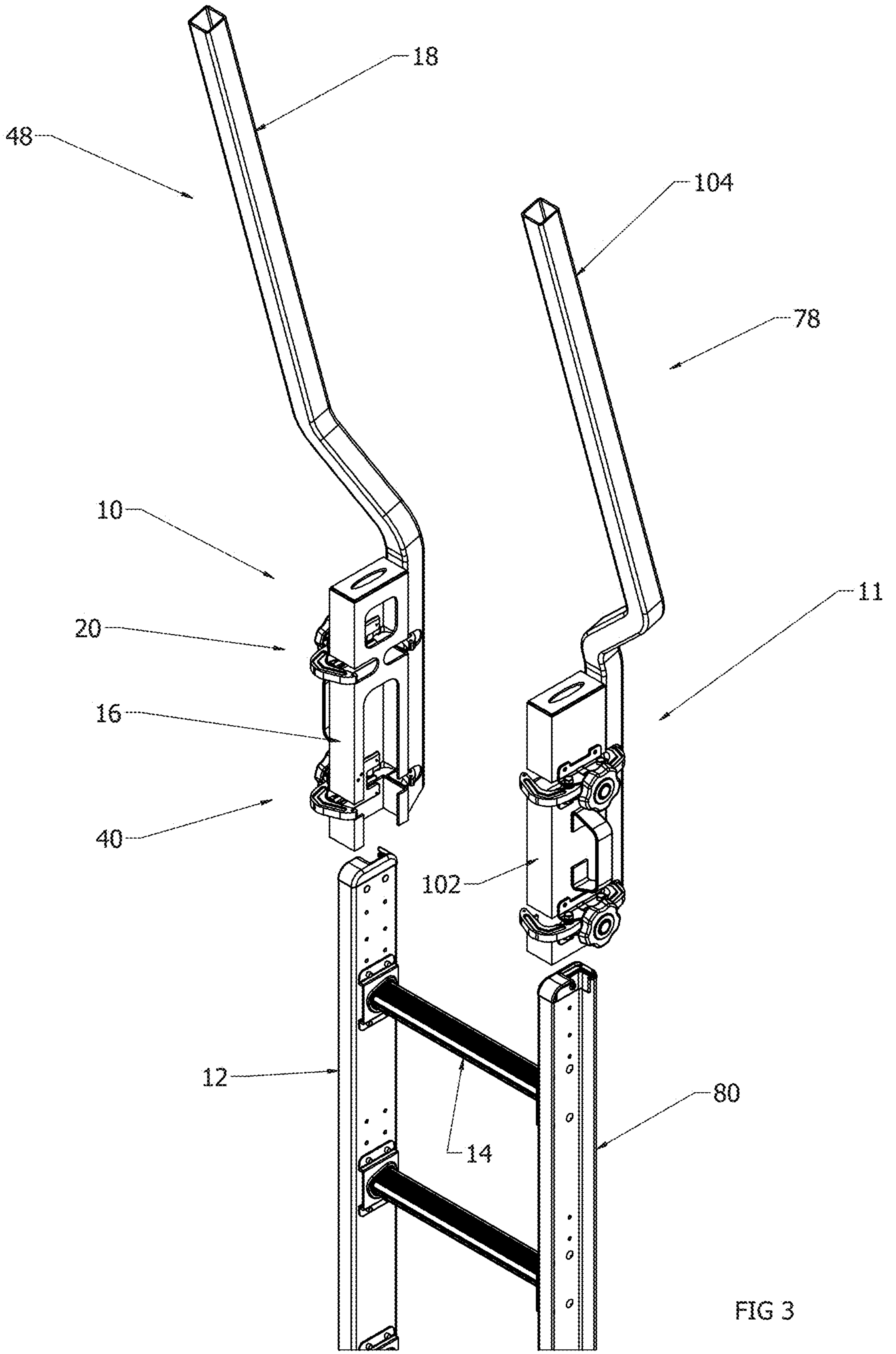
FIG. 3 shows a first accessory and a second accessory about to be installed on a ladder. All four clamps are wide open.

FIG. 3 shows a first accessory 10 and a second accessory 11, a RH (right-hand) and LH (left-hand), about to be installed on a ladder. All four clamps formed from the four locking assemblies are wide open.

Figure 4A:
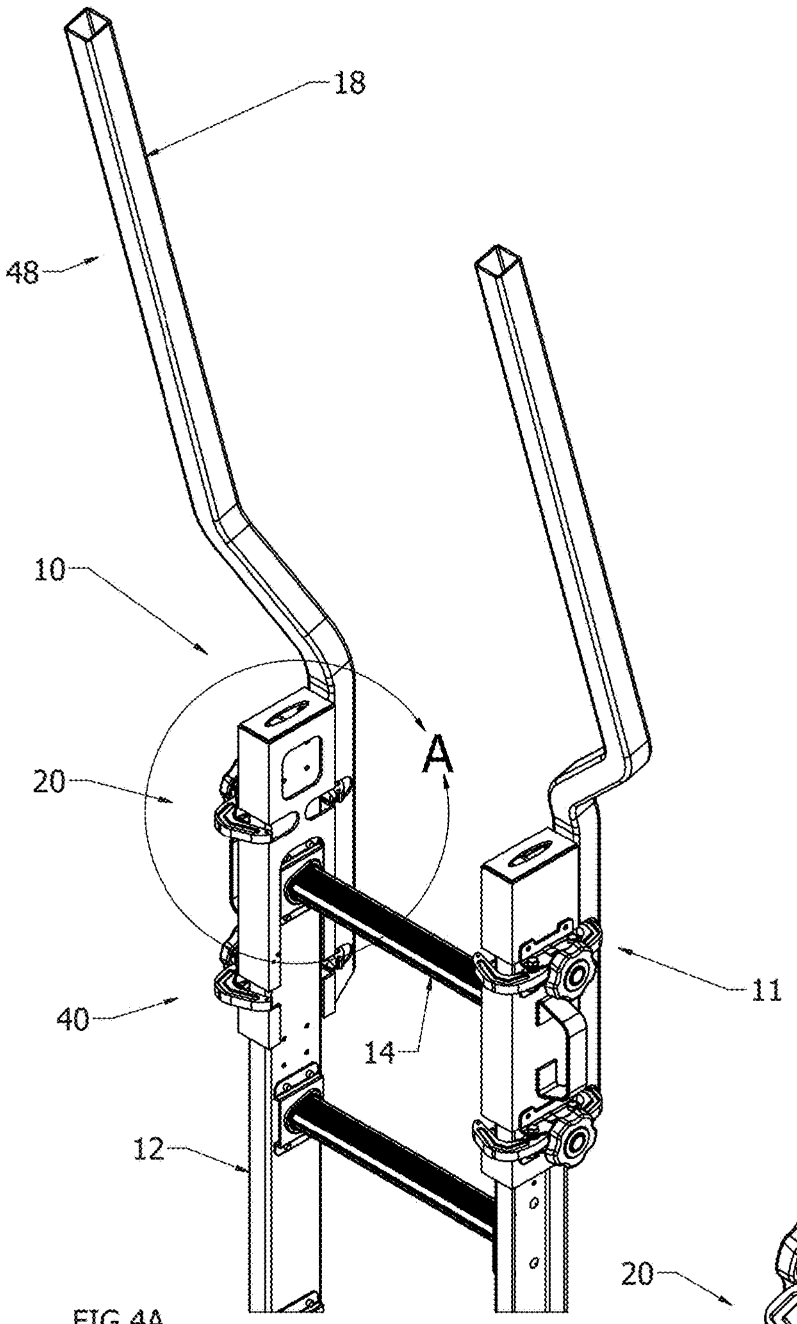
FIGS. 4A and 4B show the accessories in place but the clamps are still wide open.
Figure 4B:
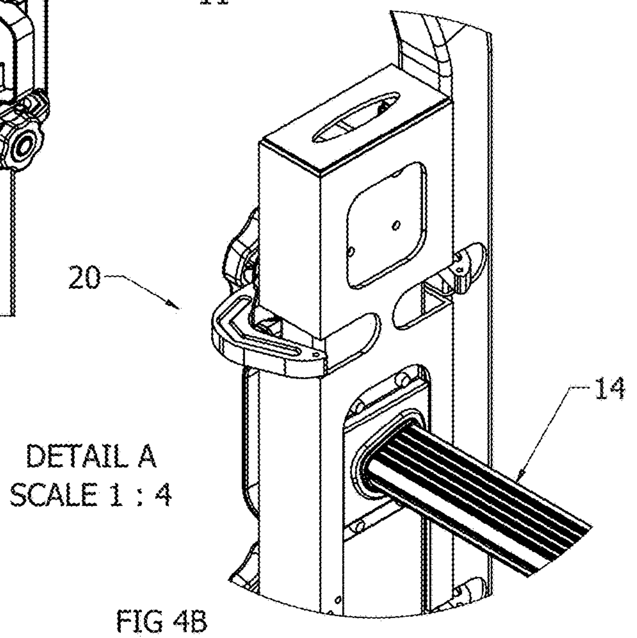

FIGS. 4A and 4B show the accessories in place but the clamps are still wide open.

Figure 5A:
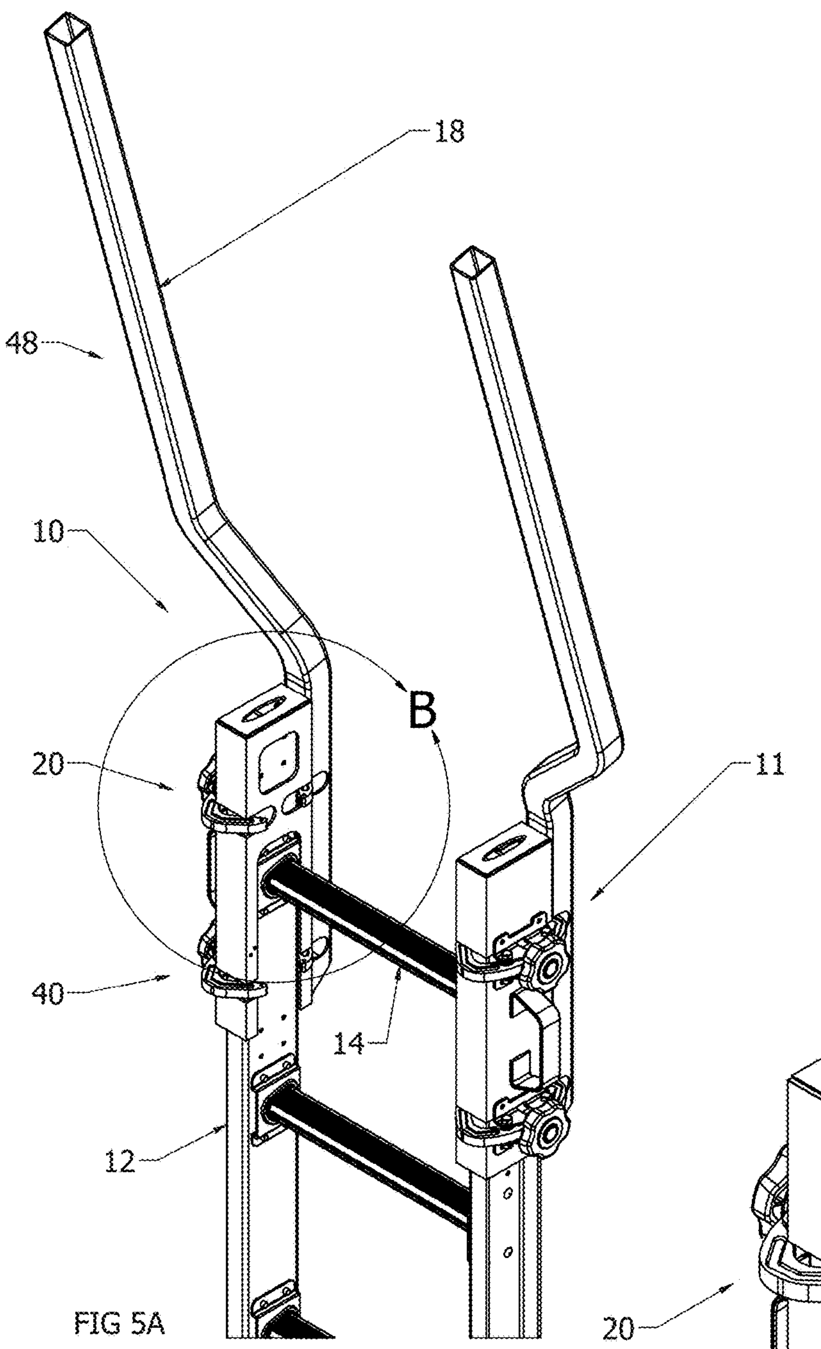
FIGS. 5A and 5B show the clamps having been tightened by turning the knobs and the clamp jaws tightly gripping the ladder rails.
Figure 5B:
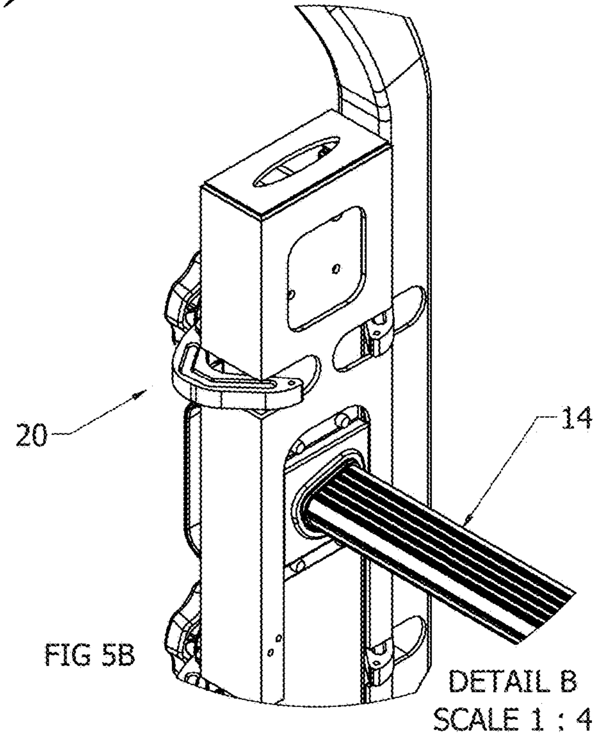
Figure 6E:
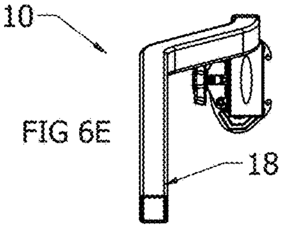
FIGS. 6A, 6B, 6C, 6D, 6E and 6F show multiple views of the first accessory. The second accessory is a mirror image.
Figure 6C:
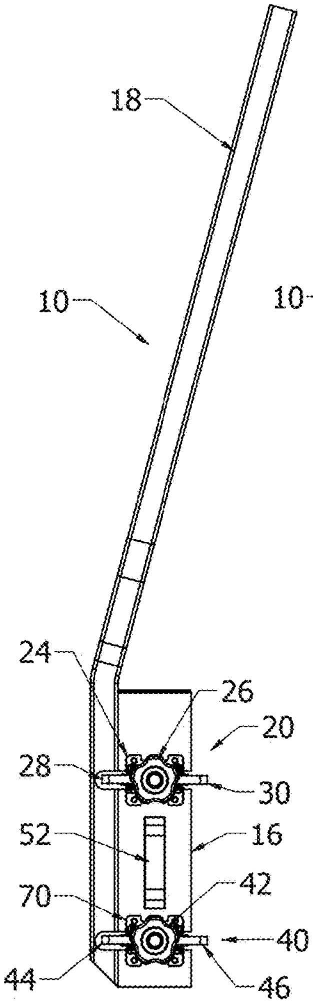
Figure 6D:
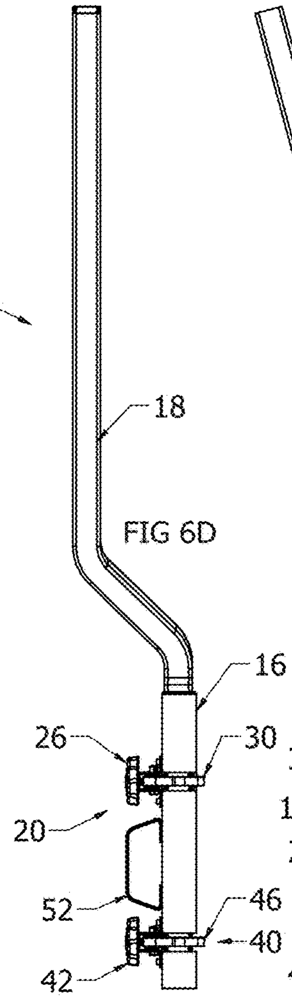
Figure 6A:
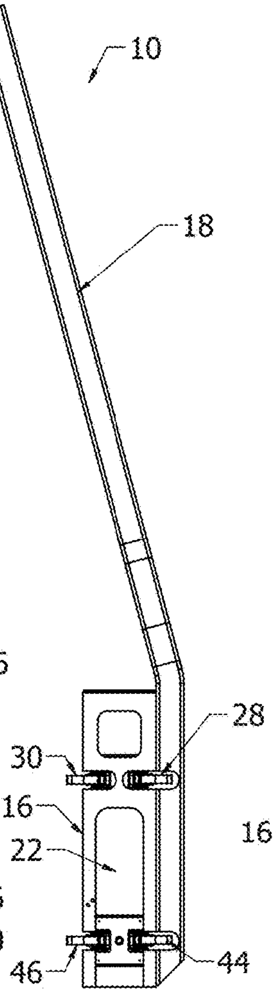
Figure 6B:
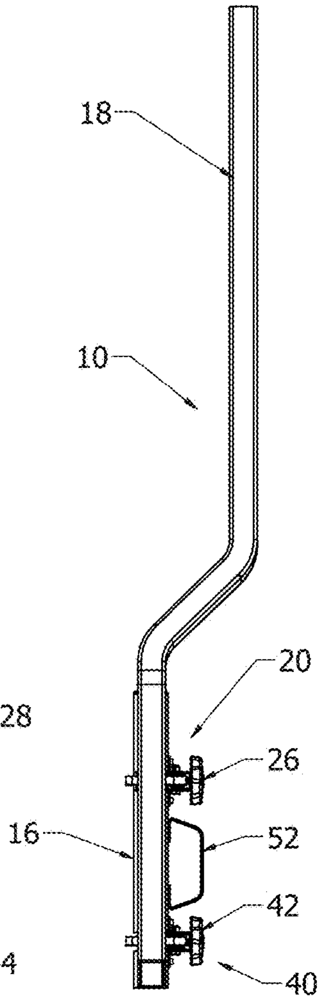
Figure 6F:
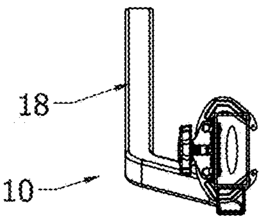

FIGS. 5A and 5B show the clamps having been tightened by turning the knobs and the clamp jaws tightly gripping the ladder rails 12.

FIGS. 6A-6F show multiple views of the LH Walk Through accessory embodiment. The RH version is a mirror image. The elongate member 18 is preferably welded to the side of the housing 16, although rivets or bolts may also be used to fixedly and permanently directly attach the elongate member 18 to the housing 16.

Figure 58:
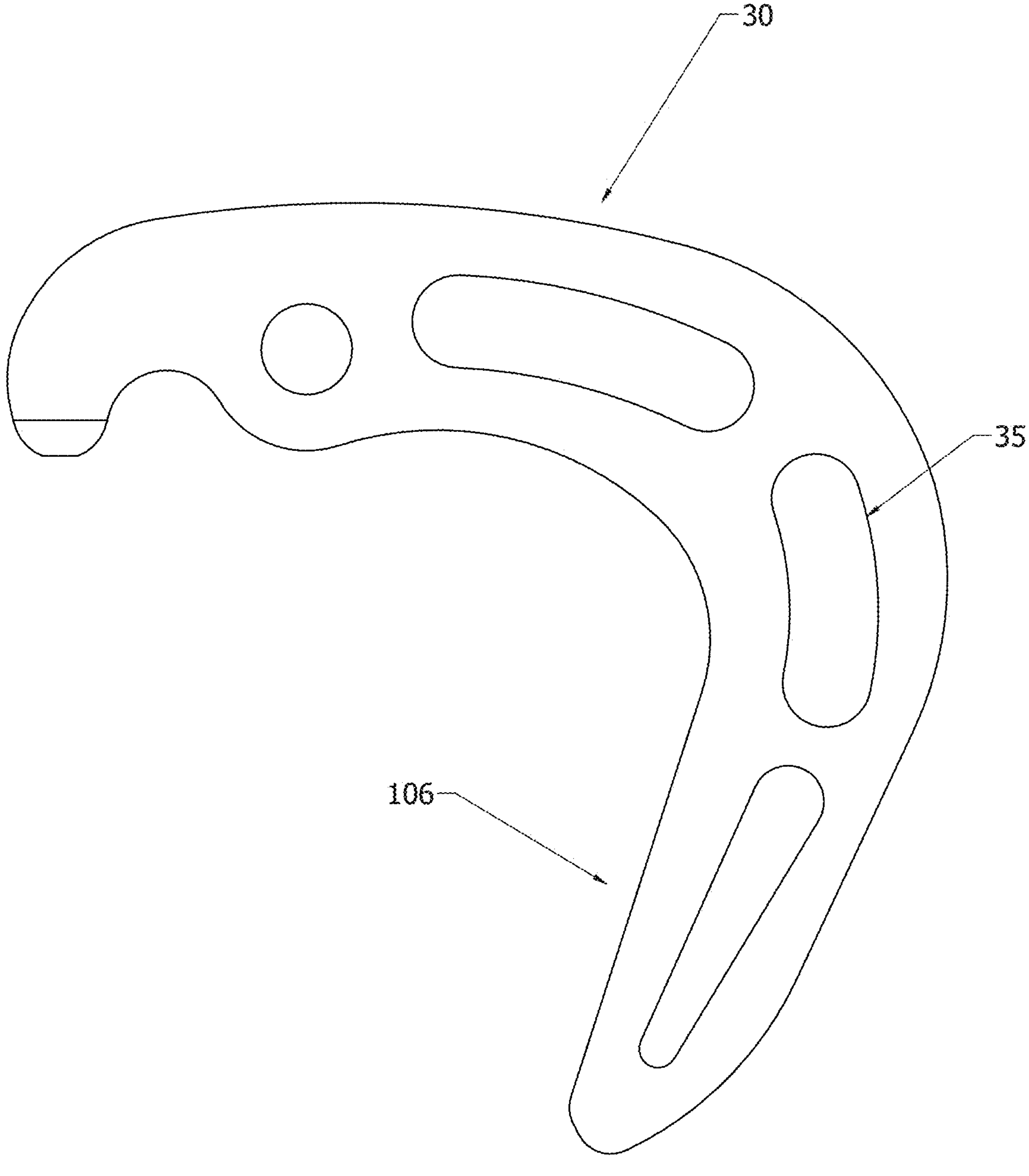
FIG. 58 shows an alternative embodiment of a jaw.

FIG. 7 is a side view of a second jaw 30. The second jaw 30 is C-shaped to form a hook, and the opposing first jaw 28 together when they are closed around the rail by turning the knobs, form a vice or clamp about the first rail 12, securely and tightly holding the housing 16 to the first rail 12, without movement. The second jaw 30 is cast and has a depression 33. The cross section across the depression 33 may be considered as having an I-beam type cross section. The depression 33 serves to reduce the amount of material needed to produce the second jaw 30. FIG. 8 is a front view of a second jaw 30. FIG. 9 shows a gnarled surface 106 of the second jaw 30. The gnarled surface 106 directly contacts the first rail 12. The gnarled surface 106 acts as a tread to better grip the first rail 12. The gnarled surface 106 of each jaw, which is flat, compresses against a flat surface of an opposing side of the first rail 12, whether it be opposing sides of a box shaped rail or opposing flanges of a c-shaped rail. That is, the flat gnarled surface of the second jaw 30 conforms with the flat surface of the first rail 12 against which it squeezes as it is tightened with the turning of the knob 26. FIG. 58 shows an alternative embodiment of the second jaw 30. In the alternative embodiment the second jaw 30 is an extruded profile which has three gaps 35 to reduce the amount of material needed to produce the second jaw 30 and consequently its weight. The reason for the change from depressions 33 to gaps 35 is the nature of the production processes. For extrusion and extruded parts, the through-all gaps 35 is the best way to reduce mass while maintaining the required strength since a fixed-shaped profile can only be extruded. The aforementioned description of the second jaw 30 is representative of all jaws herein and is applicable for all jaws.

Figure 13:
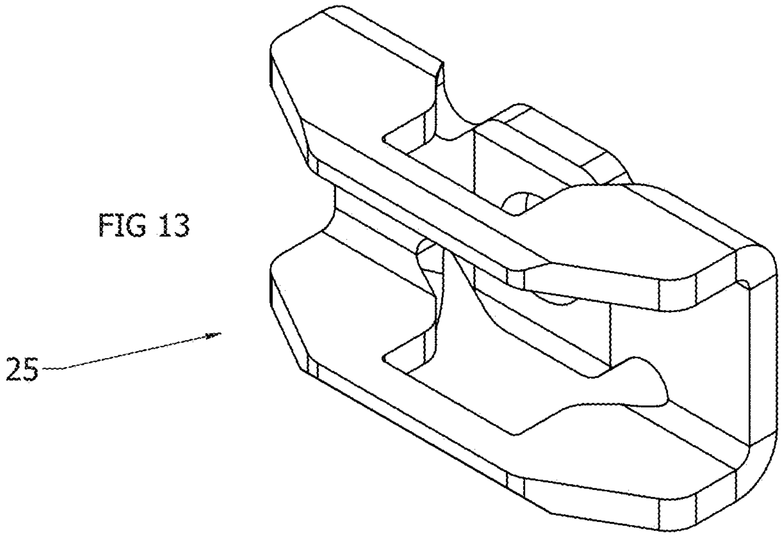
FIG. 13 is a perspective view of a lift bracket which fits into the bracket. The first and second jaws fit into the openings of the lift bracket.
Figure 14:
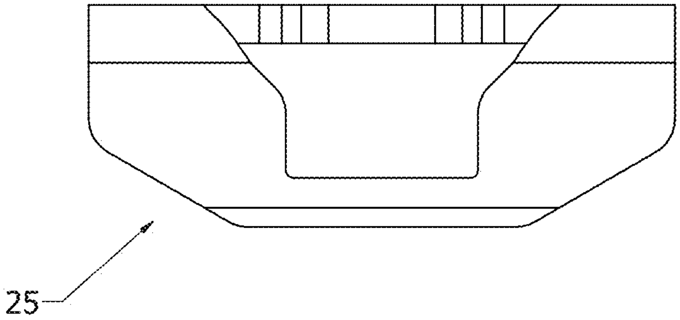
FIG. 14 is a side view of a lift bracket.
Figure 15:
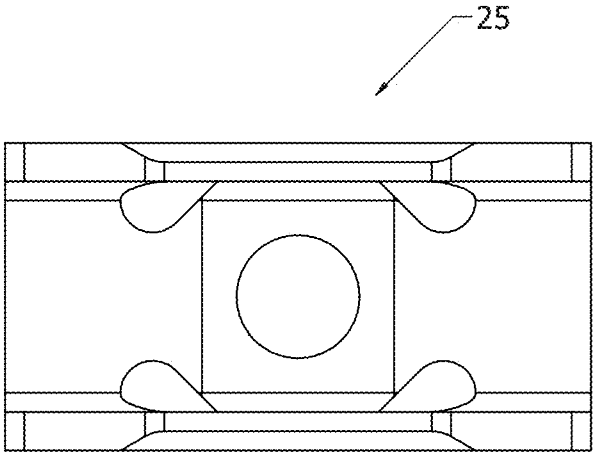
FIG. 15 is a bottom view of a lift bracket.

FIG. 10 is a perspective view of a bracket 24. FIG. 11 is a side view of the bracket 24. FIG. 12 is a bottom view of the bracket 24. FIG. 13 is a perspective view of a lift bracket 25 which fits into the bracket 24. The first and second jaws 28, 30 fit into the openings of the lift bracket 25. FIG. 14 is a side view of a lift bracket 25. FIG. 15 is a bottom view of a lift bracket 25.

FIG. 16 is a perspective view of a square nut 27 of the locking assembly which fits onto the lift bracket and through which a stem 108 of the knob 26 extends. FIG. 17 is a perspective view of a retaining ring 110 of the locking assembly. FIG. 18 is a perspective view of a nylon flat washer 112 of the locking assembly 20.

Figure 19:
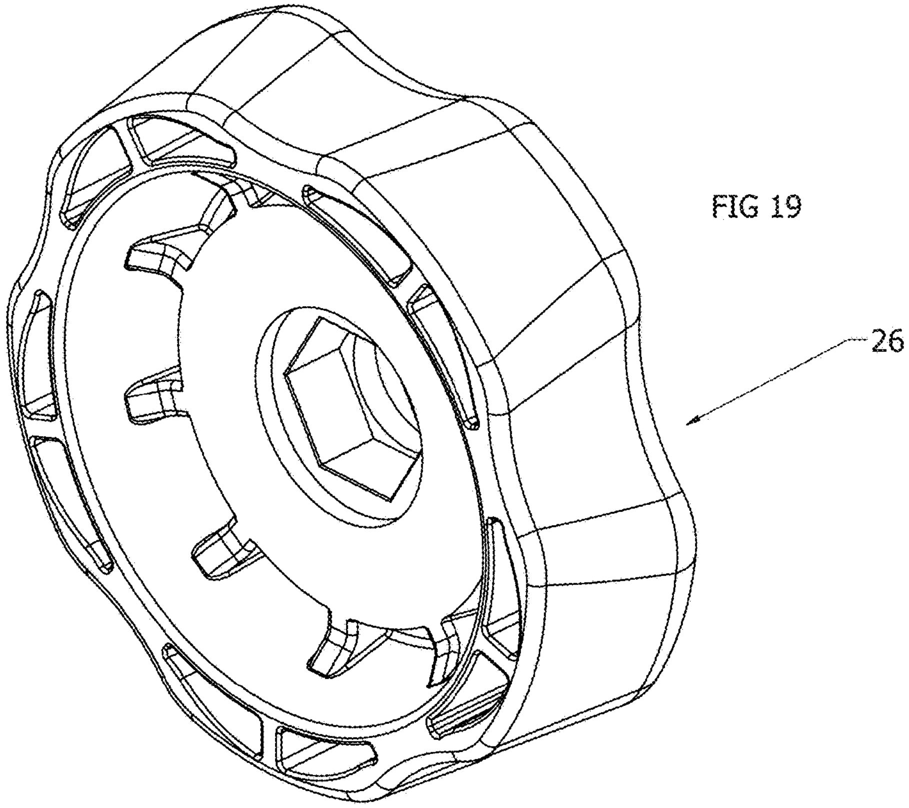
FIG. 19 is a bottom perspective view of the knob.
Figure 20:
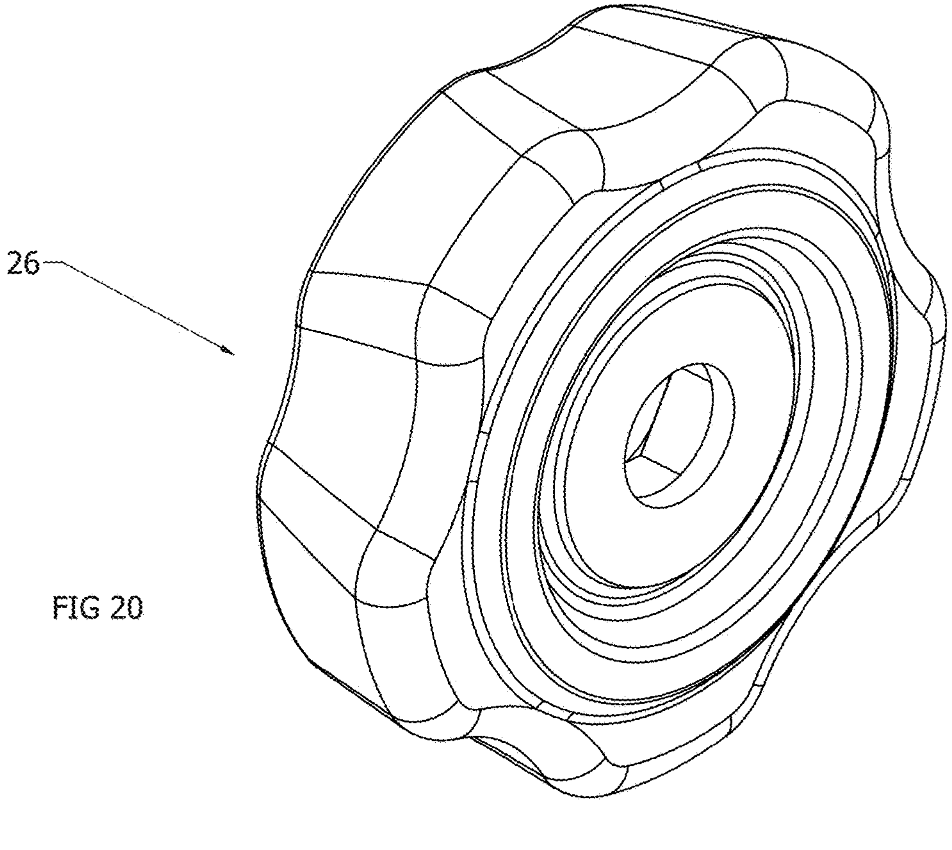
FIG. 20 is a top perspective view of the knob.
Figure 21:
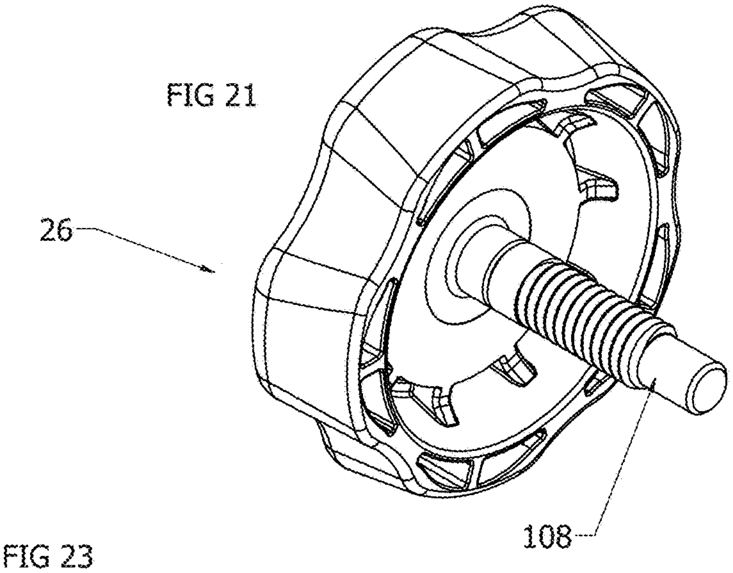
FIG. 21 is a bottom perspective view of the knob with the stem.
Figure 23:
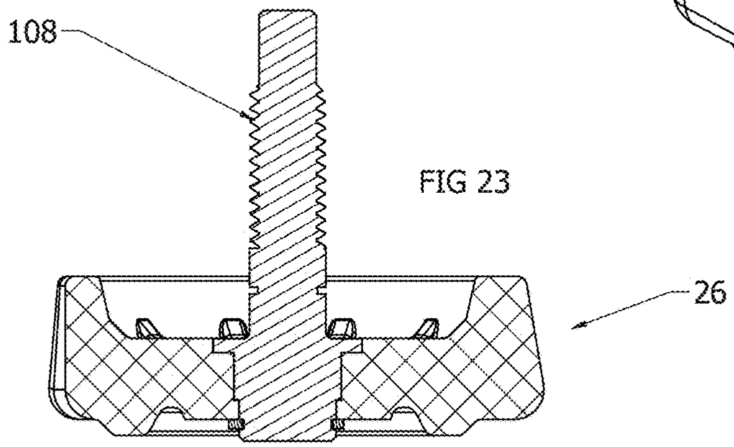
FIG. 23 is a cross-sectional view of the knob assembly of FIG. 22.
Figure 22:
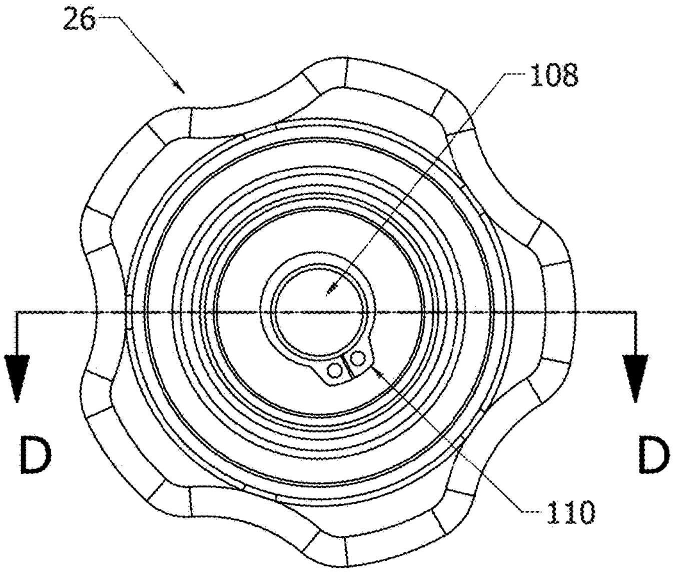
FIG. 22 is a bottom view of the knob assembly.
Figure 24:
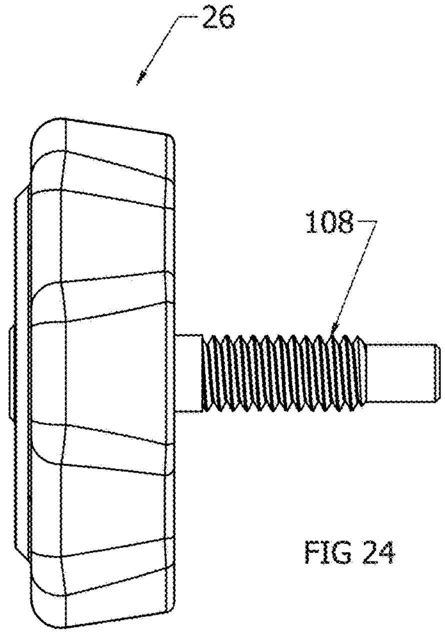
FIG. 24 is a side view of the knob assembly.

FIG. 19 is a bottom perspective view of the knob 26. FIG. 20 is a top perspective view of the knob 26. FIG. 21 is a bottom perspective view of the knob 26 with the stem 108. FIG. 22 is a bottom view of the knob 26 with the stem 108 and the retaining ring 110. FIG. 23 is a cross-sectional view of the knob 26—stem 108—retaining ring 110 of FIG. 22. FIG. 24 is a side view of the knob 26 and stem 108.

Figure 25:
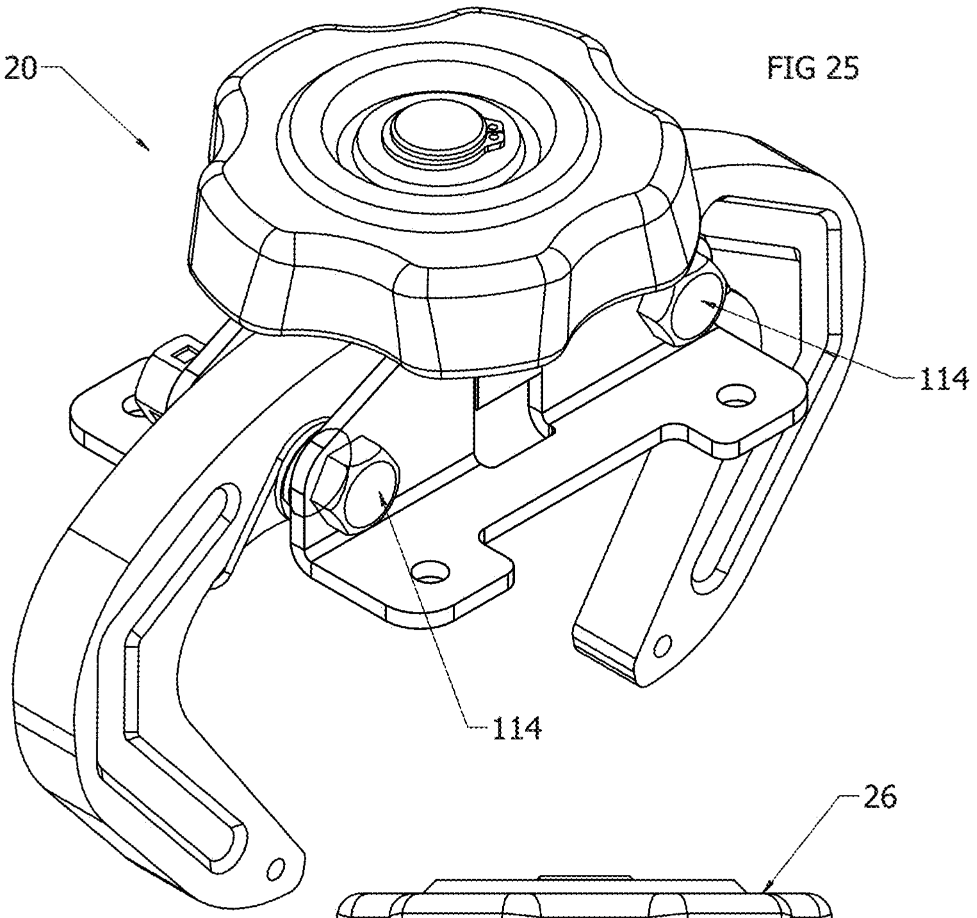
FIG. 25 is a perspective view of the locking assembly.
Figure 26:
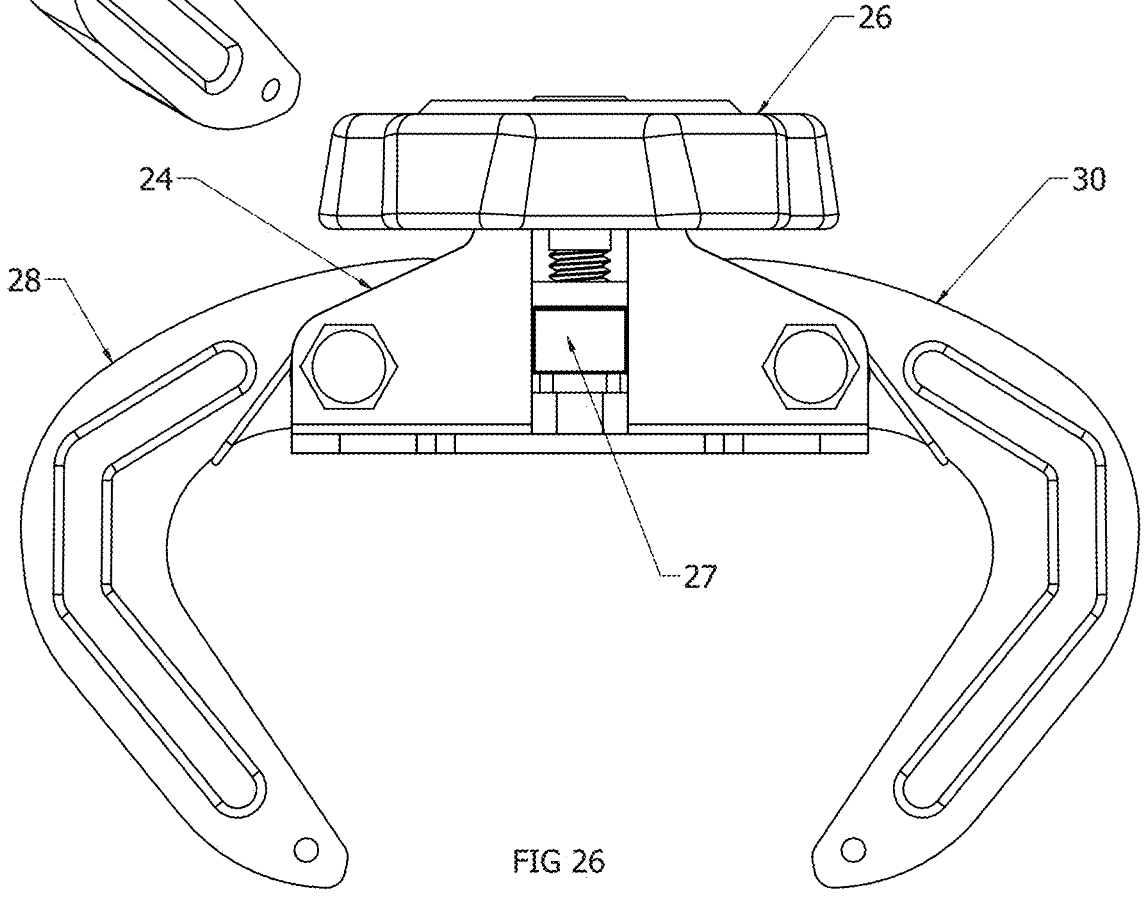
FIG. 26 is a side view of the locking assembly.

FIG. 25 is a perspective view of the locking assembly 20. FIG. 26 is a side view of the locking assembly 20. FIG. 27 is a front view of the locking assembly 20. The carriage bolt 114 extends through a first wall 120 of the first bracket 24, through a spring 118, through a second wall 121 of the first bracket 24 and a hex nut 116. The same structure is applicable regarding a second carriage bolt 114 on the other side of the bracket 24. FIG. 28 is a cross-sectional view of the locking assembly 20 of FIG. 27.

Figure 29:
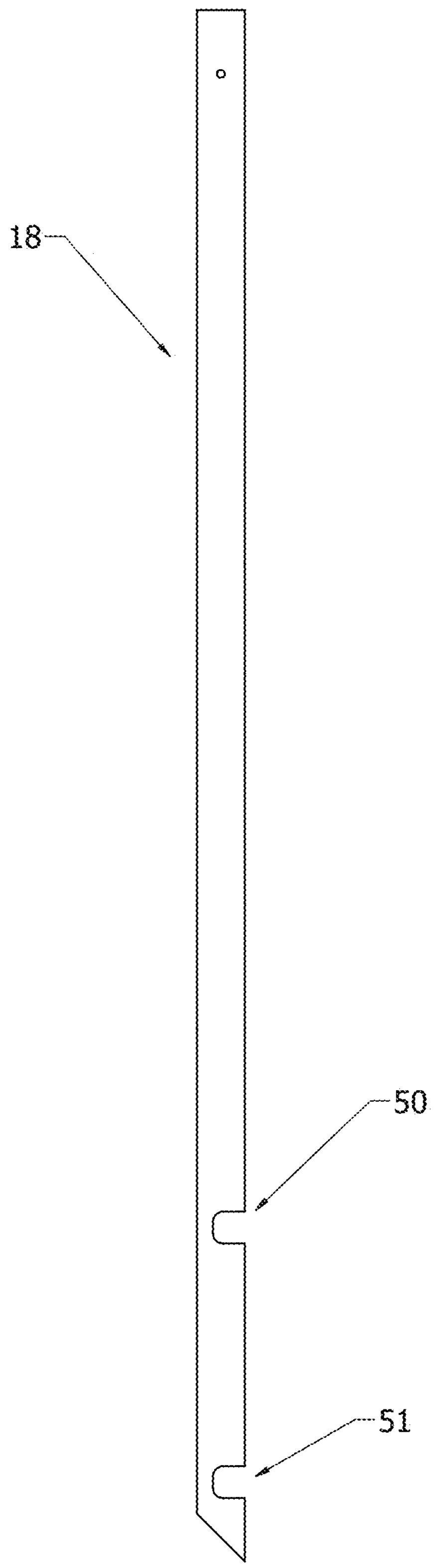

FIG. 29 is a side view of an elongate member 18 which is an arm of a walk through. FIG. 30 is a front view of a right-hand arm of the walk through. The first elongate slot 50 and the second elongate slot 51 of the elongate member 18. The left-hand arm is a mirror image of the right-hand arm.

Figure 31:
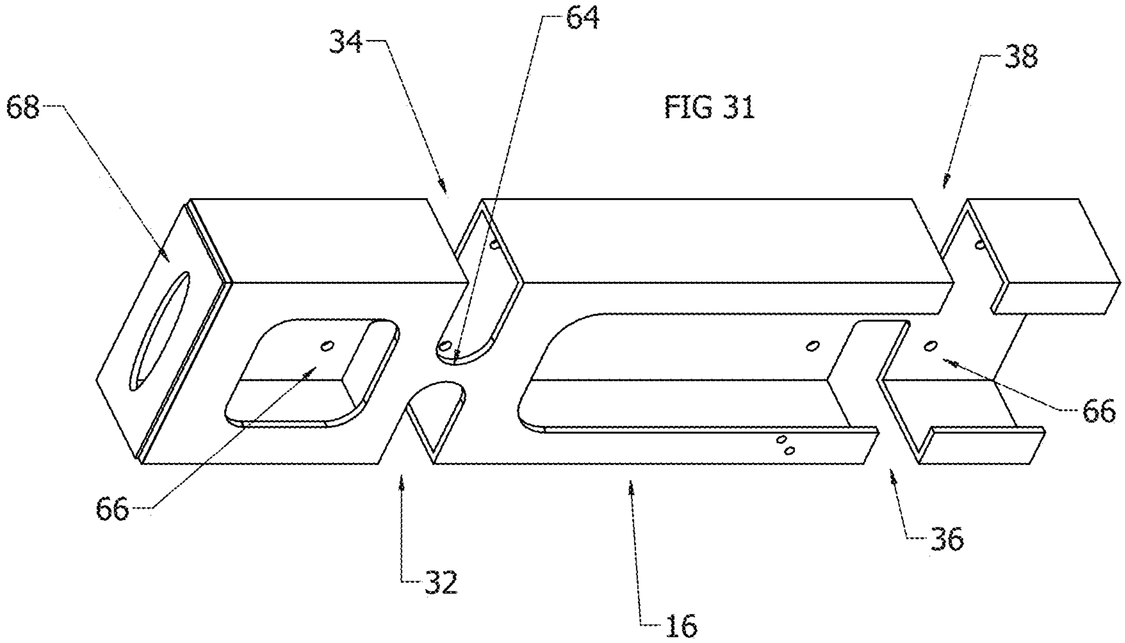
FIG. 31 is a front perspective view of the housing.
Figure 33:
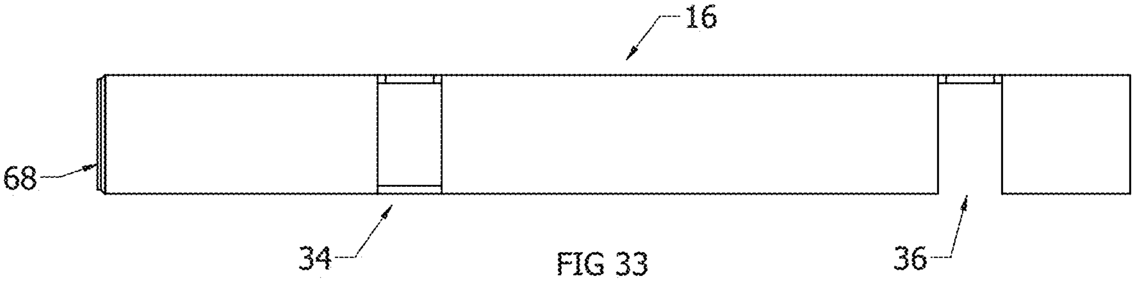
FIG. 33 is a side view of the housing.
Figure 32:
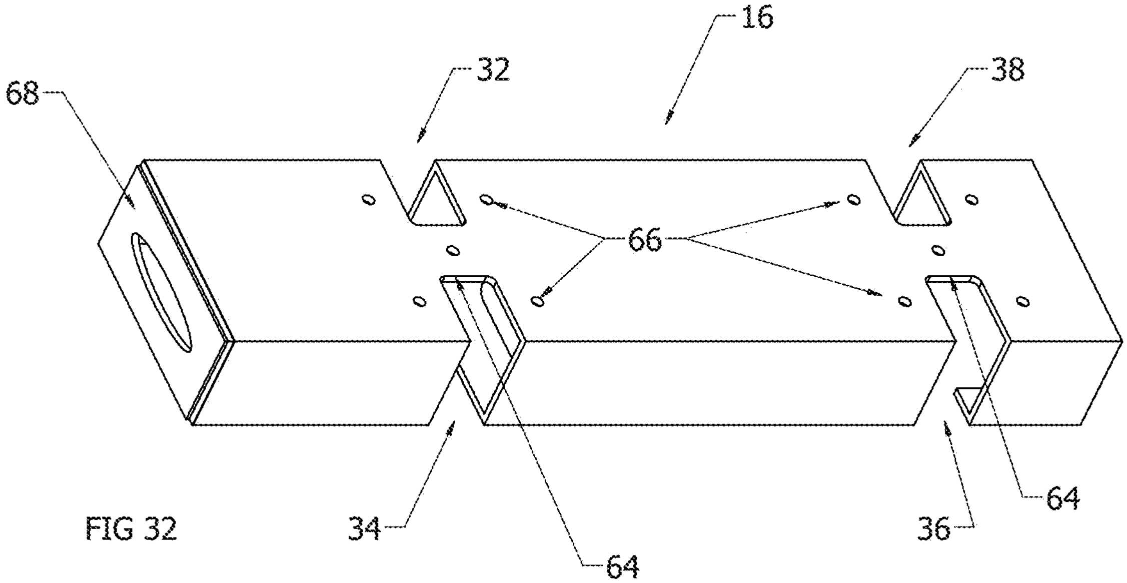
FIG. 32 is a rear perspective view of the housing.

FIG. 31 is a front perspective view of the housing 16. FIG. 32 is a rear perspective view of the housing 16. FIG. 33 is a side view of the housing 16.

Figure 34:
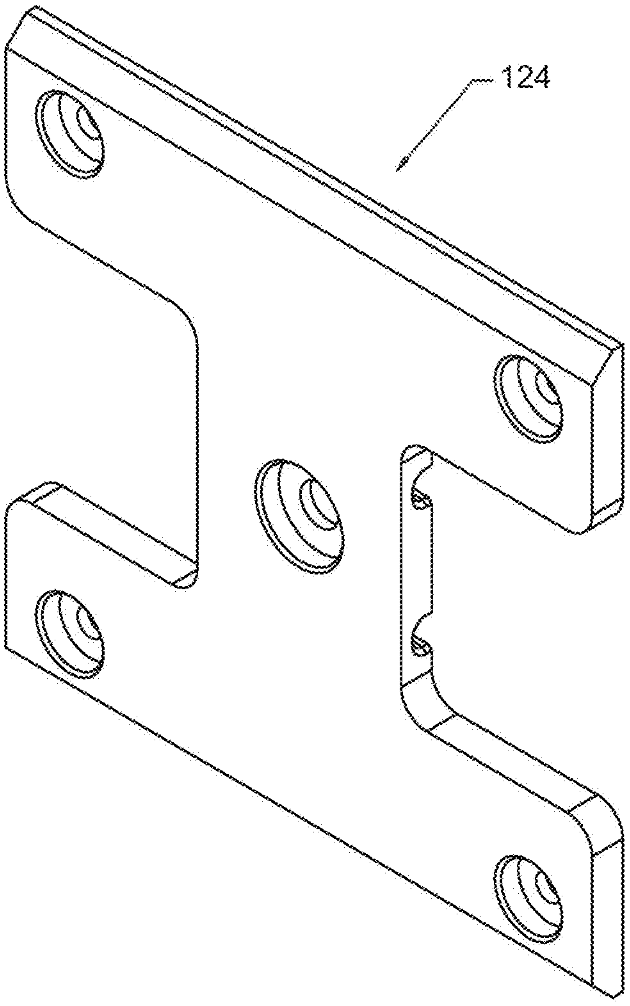
FIG. 34 is a perspective view of a backup pad.
Figure 35:
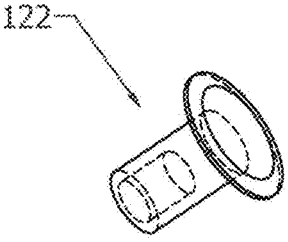
FIG. 35 is a perspective view of a hollow end rivet showing the hollow region with dashed lines.
Figure 36:
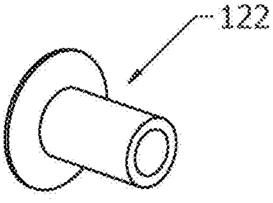
FIG. 36 is a perspective view of the hollow end rivet.

FIG. 34 is a perspective view of a backup pad 124. FIG. 35 is a perspective view of a hollow end rivet 122 showing the hollow region with dashed lines. FIG. 36 is a perspective view of the hollow end rivet 122.

Figure 40:
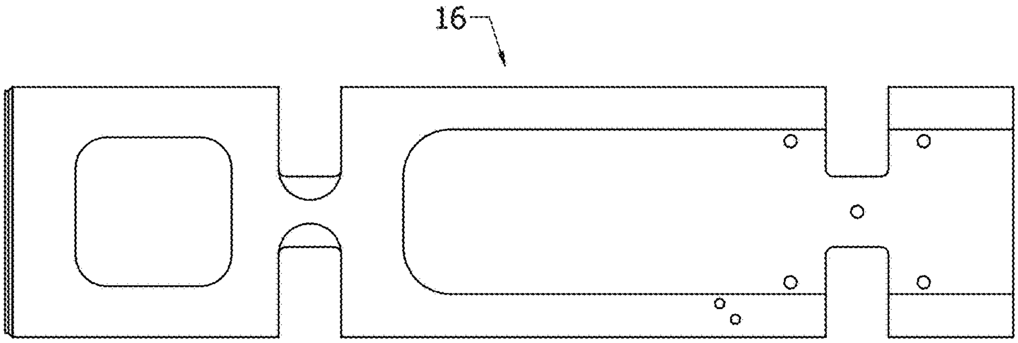
FIG. 40 is a rear view of the housing with the handle. The right-hand housing with the handle is a mirror image.
Figure 39:
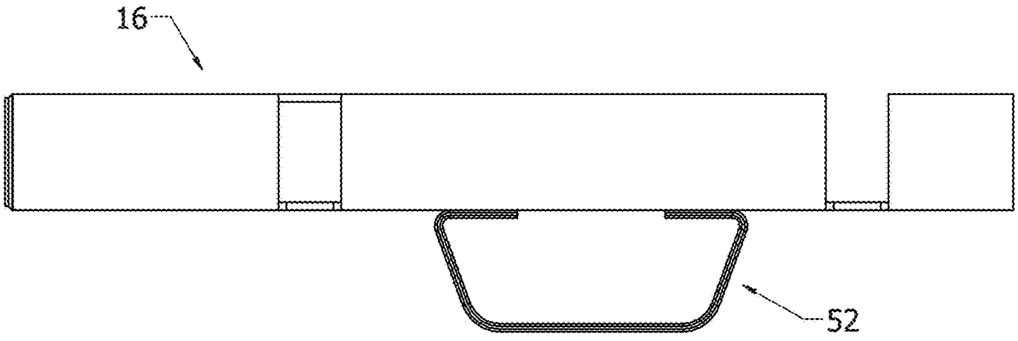
FIG. 39 is a side view of the left-hand housing with the handle.
Figure 38:
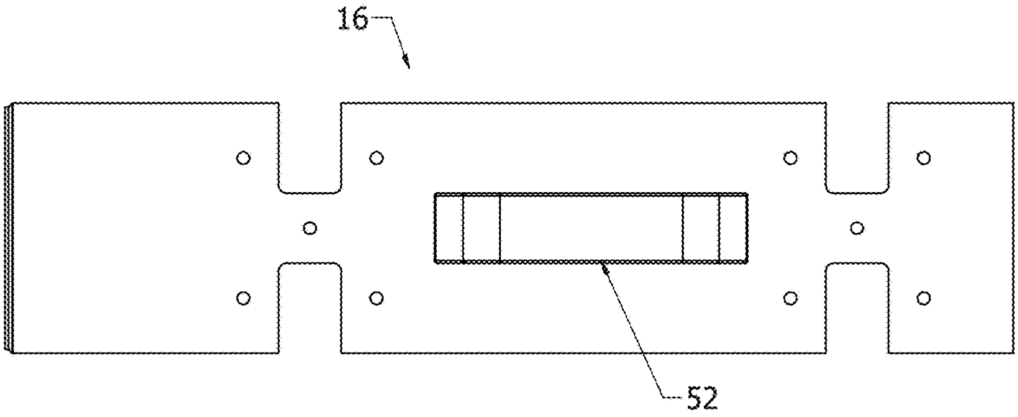
FIG. 38 is a front view of the housing with the handle.
Figure 37:
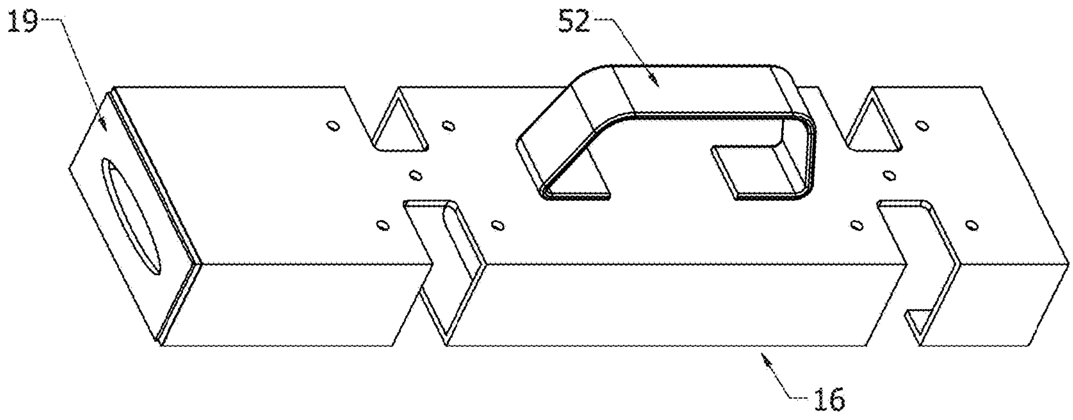
FIG. 37 is a front perspective view of the housing with a handle.
Figure 41:
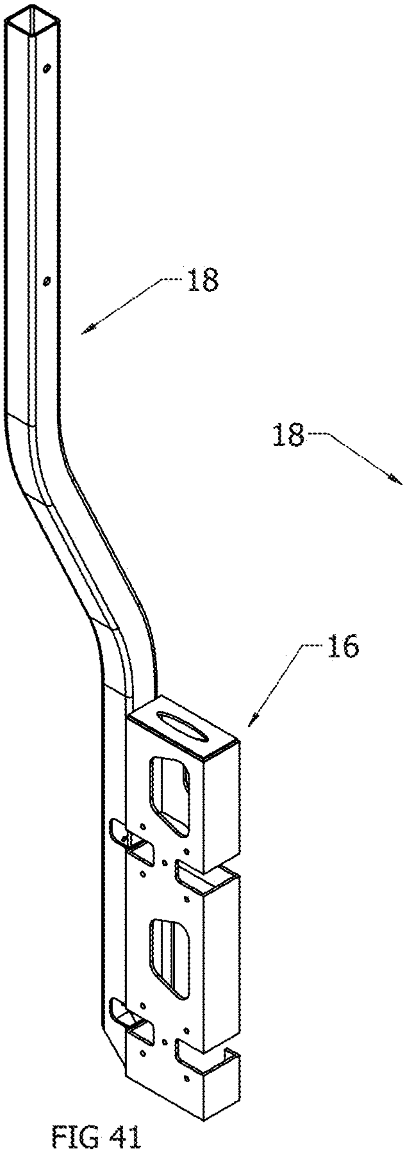
FIG. 41 is a perspective view of the housing with the elongate member attached. The slots and the elongate member align with the corresponding slots of the housing.
Figure 42:
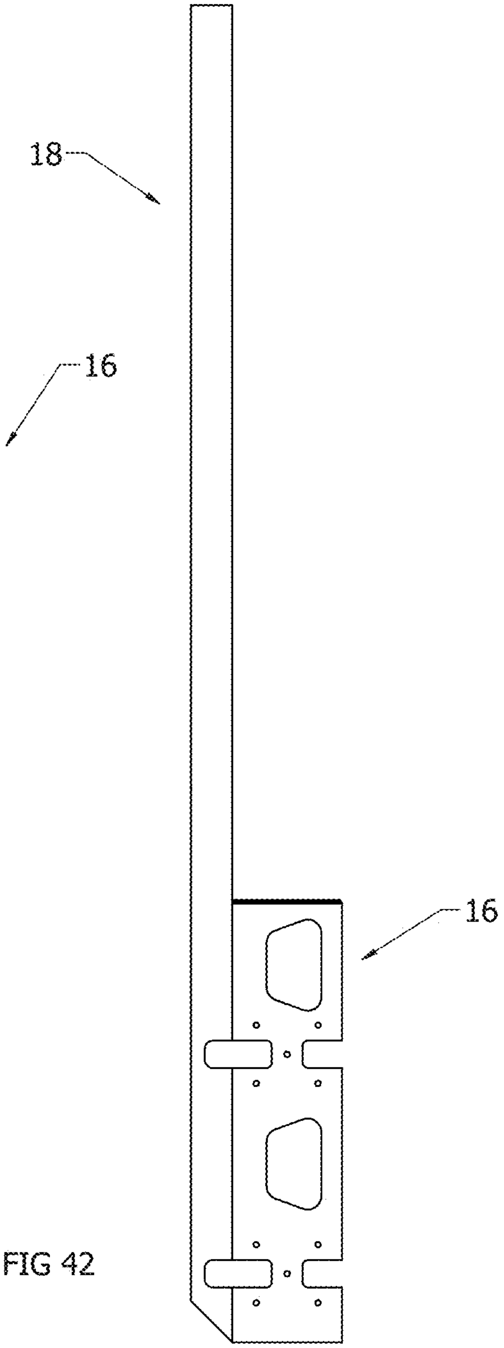
FIG. 42 is a side view of the housing with the elongate member.
Figure 43:
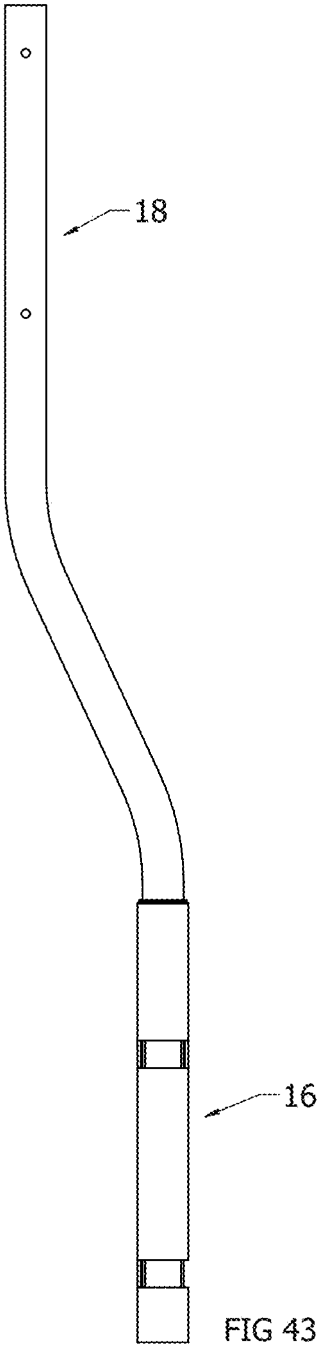
FIG. 43 is a front view of the left-hand housing with the elongate member. The right-hand housing with the elongate member is a mirror image.

FIG. 37 is a front perspective view of the housing 16 with a handle 52. FIG. 38 is a front view of the housing 16 with the handle 52. FIG. 39 is a side view of the left-hand housing 16 with the handle 52. FIG. 40 is a rear view of the housing 16 with the handle 52. The right-hand housing 102 with the handle 52 is a mirror image. FIG. 41 is a perspective view of the housing 16 with the elongate member 18 attached. The jaw slots of the elongate member 18 align with the corresponding jaw slots of the housing 16. FIG. 42 is a side view of the housing 16 with the elongate member 18. FIG. 43 is a front view of the left-hand housing 16 with the elongate member 18. The right-hand housing 102 with the elongate member 18 is a mirror image.

Figure 44:
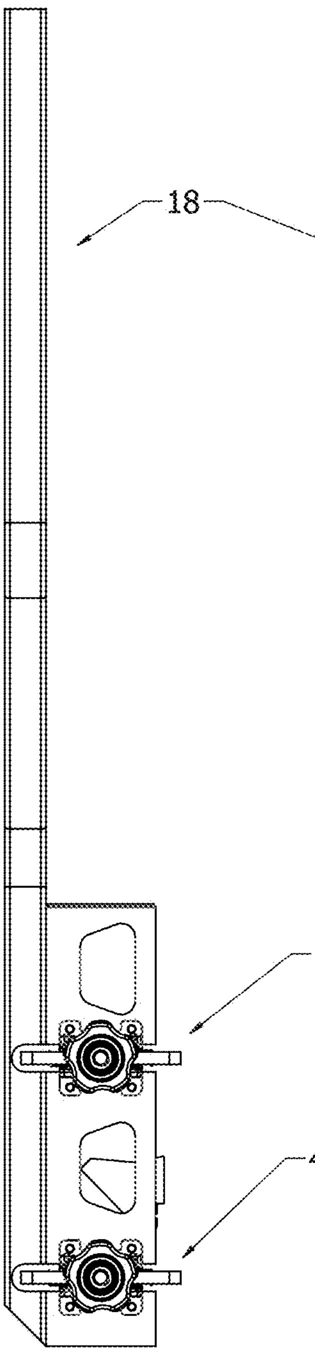
FIG. 44 is an outside view of a left-hand accessory.
Figure 45:
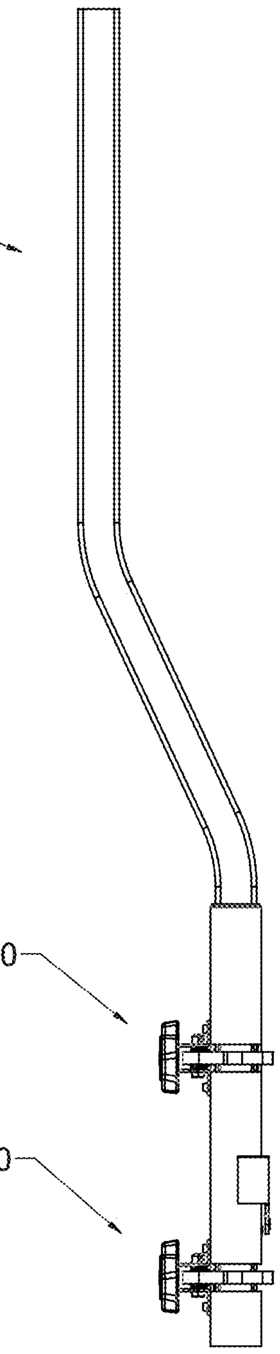
FIG. 45 is a front view of a left-hand accessory.
Figure 46:
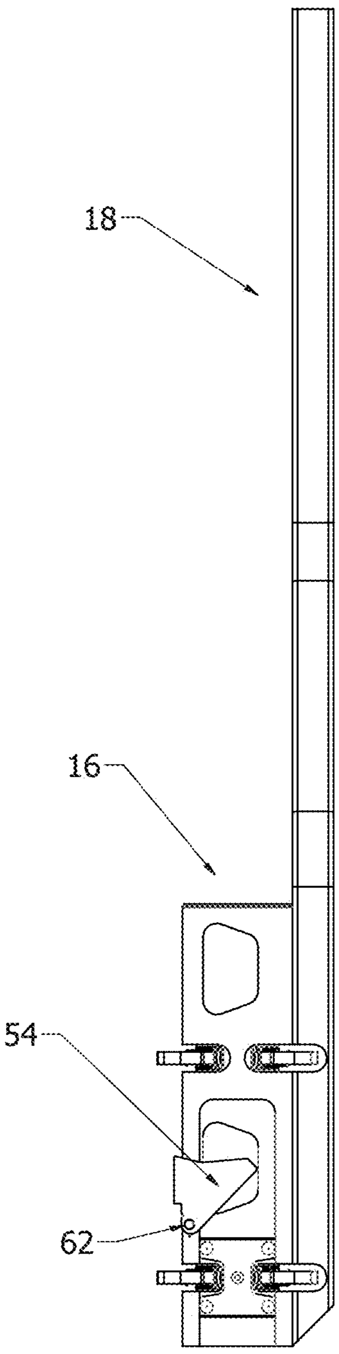
FIG. 46 is an inside view of a left-hand accessory.
Figure 47:
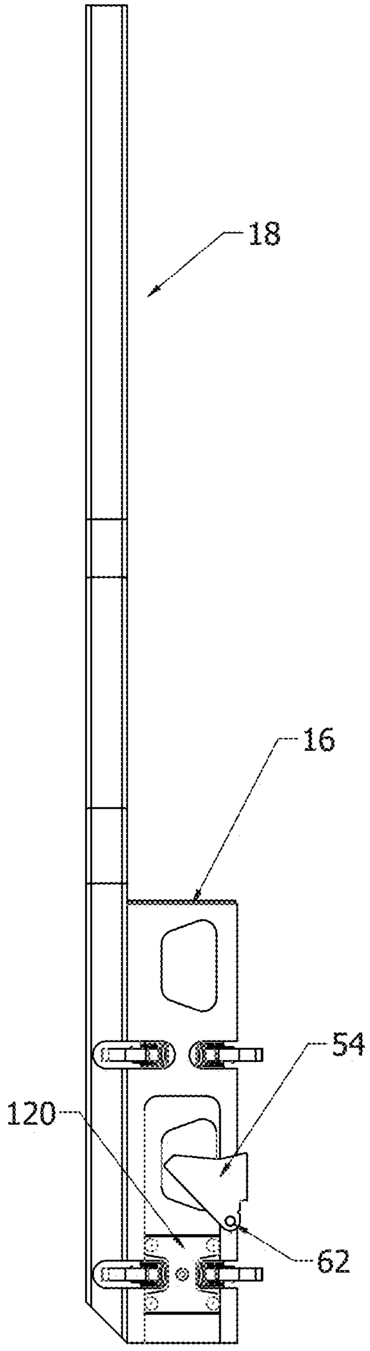
FIG. 47 is an outside view of a right-hand accessory.
Figure 48:
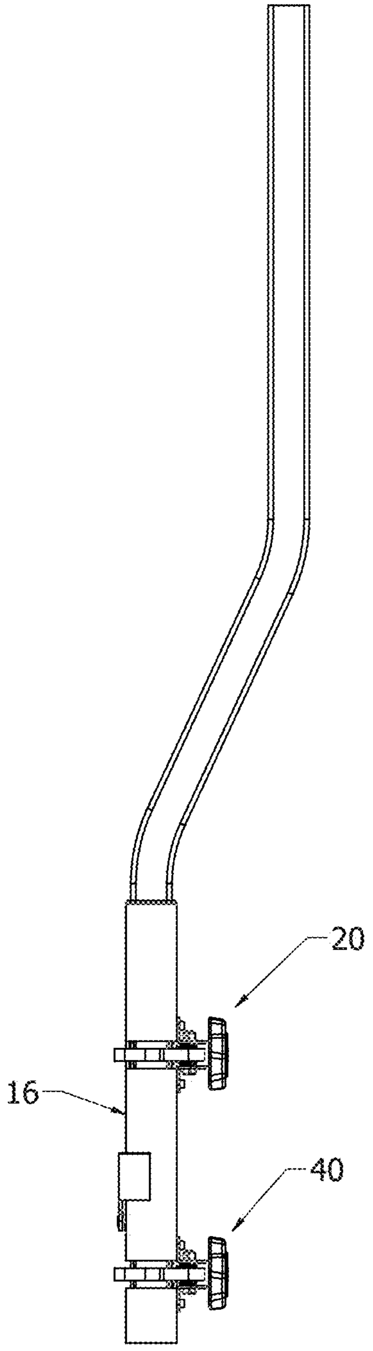
FIG. 48 is a front view of a right-hand accessory.
Figure 49:
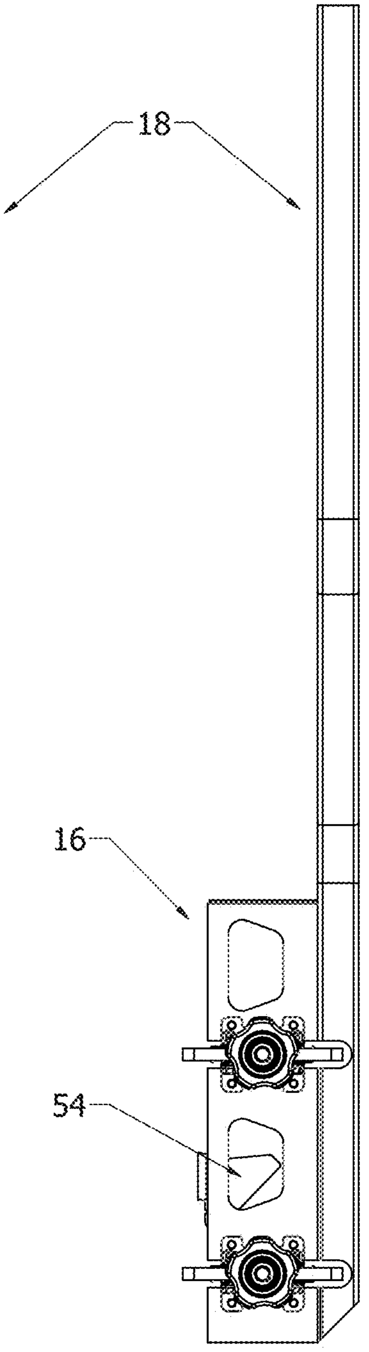
FIG. 49 is an inside view of a right-hand accessory.

FIG. 44 is an outside view of a left-hand accessory 10. FIG. 45 is a front view of a left-hand accessory 10. FIG. 46 is an inside view of a left-hand accessory 10. FIG. 47 is an outside view of a right-hand accessory 10. FIG. 48 is a front view of a right-hand accessory 10. FIG. 49 is an inside view of a right-hand accessory 10.

Figure 50:
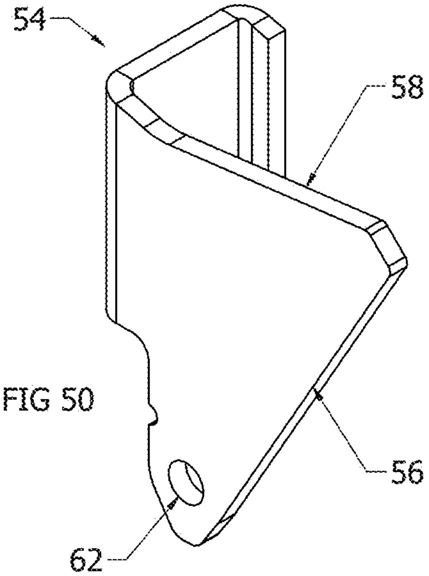
FIG. 50 is a perspective view of the latch.

FIG. 50 is a perspective view of the latch 54. The latch 54 has a bottom surface 56 which is angled upwards, preferably at about 45° from the horizontal. See FIG. 50. As the first accessory 10 is fitted over the top of the first rail and moves down the first rail, the bottom surface 56 of the latch 54 contacts the first rung 14, and is cammed aside the first rung 14 as the first accessory 10 continues to move down the first rung 14 and compresses the latch spring 59 until the latch 54 clears the first rung 14. Once the latch 54 clears the first rung 14, the latch spring 59 shown in FIG. 53, under the force of the latch spring 59 now decompressing, since the latch 54 is no longer being cammed by the first rung 14, moves back into a stable position with the horizontal flat top surface 58 of the latch 54 underneath the first rung 14. See FIGS. 46 and 47. By the horizontal flat the top surface 58 of the latch 54 being underneath the first rung 14, the first accessory 10 is blocked by the latch 54 from being lifted off or coming off of the first rail. This is because the horizontal flat top surface 58 of the latch 54 contacts the bottom of the first rung 14 when the first accessory 10 tries to be removed from the first rail, and the latch 54 is moved downward in a clockwise direction and contacts the first bracket 24, which effectively acts as a stop, preventing the latch 54 from moving downward any further, thus preventing the first accessory 10 from coming off of the first rail. In order for the first accessory 10 to be removed from the first rail, the first locking assembly 20 and the second locking assembly 40 must be loosened so their jaws no longer grip the first rail, and the latch 54 must be moved in a counterclockwise direction so the bottom surface 56 faces the first rung 14. In this position, as the first accessory 10 is lifted off of the first rail, the first rung 14 cams the bottom surface 56 and rotates the latch 54 out of the way of the first rung 14 so the latch 54 no longer blocks the first accessory 10 from coming off of the first rail. The latch spring 59 is fitted to the inside of the latch 54. The latch 54 is rotatably attached to the housing 16 with a shoulder rivet 60 extending through a latch hole 62 and anchoring to the housing 16.

Figure 51:
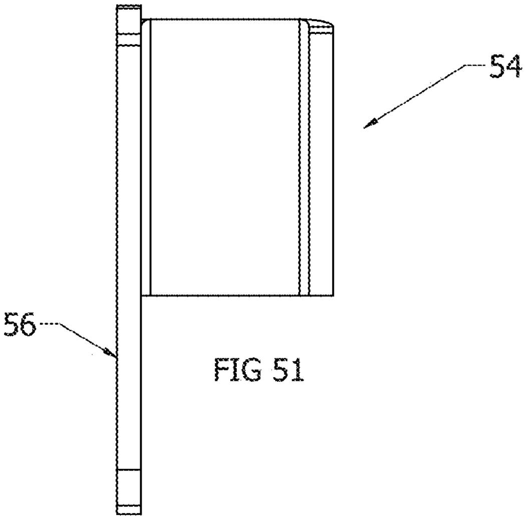
FIG. 51 is a front view of the latch.
Figure 52:
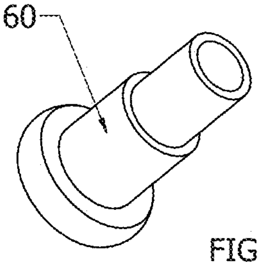
FIG. 52 is a perspective view of a steel shoulder that it.
Figure 53:
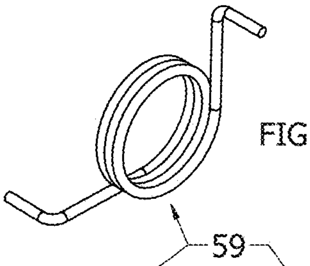
FIG. 53 is a perspective view of a latch spring.
Figure 54:
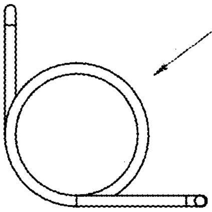
FIG. 54 is a side view of a left-hand latch spring.
Figure 55:
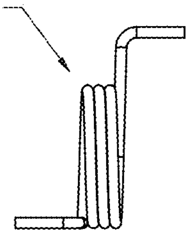
FIG. 55 is a side view of a left latch spring. The right latch is a mirror image.
Figure 56:
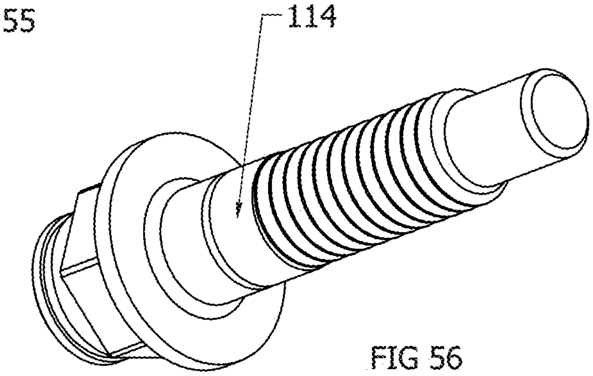
FIG. 56 is a perspective view of a square not carriage bolt.

FIG. 51 is a front view of the latch 54. FIG. 52 is a perspective view of a steel shoulder. FIG. 53 is a perspective view of a latch spring 59. FIG. 54 is a side view of a left-hand latch spring 59. FIG. 55 is a side view of a left latch spring 59. The right latch 54 is a mirror image. FIG. 56 is an effective view of a square nut carriage bolt 114.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An accessory for a ladder rail with a rung comprising:

a housing removably attached to the ladder rail, the housing including at least two engagement slots;

an elongate member coupled to and extending from the housing and including at least two elongate slots corresponding to the at least two engagement slots of the housing; and a first locking assembly coupled to the housing, wherein the first locking assembly includes a locked position and an unlocked position, in the locked position the housing and the elongate member are held onto the rail, and in the unlocked position the housing and the elongate member is permitted to be removed from the rail, wherein the housing has a rung slot which allows the housing to fit over an end of the rail and around the rung.

2. The accessory of claim 1 further comprising a first bracket coupled to the housing.

3. The accessory of claim 1 wherein the first locking assembly includes a first knob, a first jaw, and a second jaw which are engaged with the first knob and the rail, wherein rotation of the first knob causes the first jaw and the second jaw to clamp onto or separate from the rail.

4. The accessory of claim 3, wherein the housing has a first jaw slot and a second jaw slot, the first jaw positioned within the first jaw slot and the second jaw positioned within the second jaw slot, wherein, when the first locking assembly is in the locked position, the first jaw and the second jaw contact the rail through the first jaw slot and the second jaw slot and clamp the housing to the rail.

5. The accessory of claim 4 wherein the first jaw aligns with one of the at least two elongate slots through which the first jaw extends to contact the rail.

6. The accessory of claim 3 further comprising a second locking assembly including a second knob, a third jaw, and a fourth jaw which are engaged with the second knob and the rail, wherein rotation of the second knob causes the third jaw and the fourth jaw to clamp onto or separate from the rail.

7. The accessory of claim 1 wherein a cross-section of the housing is rectangular shaped and the housing is hollow and includes a perimeter which is greater than a perimeter of a cross-section of the rail such that the housing fits around the end of the rail.

8. The accessory of claim 1 wherein the elongate member comprises a first ladder grip for a walk through.

9. The accessory of claim 1 wherein the housing includes a handle.

10. The accessory of claim 1 wherein the housing includes a latch and a latch spring which are configured to prevent the housing from being inadvertently removed from the rail.

11. The accessory of claim 1 further comprising a first bracket coupled to the housing.

12. The accessory of claim 11 wherein the first locking assembly is coupled to the first bracket and includes a first knob, a first jaw, a second jaw, and a connector, wherein the first jaw and the second jaw are connected via the connector and movable with the connector, and wherein the first jaw and the second jaw engage the rail by passing through the at least two engagement slots of the housing and the at least two elongate slots.

13. The accessory of claim 12 wherein when the first locking assembly goes from the unlocked position to the locked position, the first knob is rotated which causes the connector to move towards the first knob and cause the first jaw and the second jaw to clamp towards the rail.

14. The accessory of claim 12 further comprising a lift bracket disposed within the first bracket, and wherein the lift bracket contacts a portion of the first jaw, the second jaw, and the connector.

15. A ladder comprising:

a first rail;

a second rail in parallel and spaced relation with the first rail;

at least one rung attached to the first rail and the second rail;

a first housing removably and fixedly attached to the first rail and the at least one rung, the first housing including at least two first engagement slots;

a second housing removably and fixedly attached to the second rail and the at least one rung, the second housing including at least two second engagement slots, the second housing distinct and independent of the first housing;

a first elongate member coupled to and extending from the first housing;

a second elongate member coupled to and extending from the second housing;

a first locking assembly coupled to the first housing; and a second locking assembly coupled to the second housing, wherein the first locking assembly and the second locking assembly include a locked position and an unlocked position, in the locked position the first housing and the first elongate member are held onto the first rail and the second housing and the second elongate member are held onto the second rail, and in the unlocked position the first housing and the first elongate member are permitted to be removed from the first rail, and the second housing and the second elongate member are permitted to be removed from the second rail, wherein the first housing and the second housing include a latch and a latch spring which are configured to prevent the first housing and the second housing from being inadvertently removed from the first rail and the second rail.

16. The ladder of claim 15 further comprising a first bracket coupled to the first housing and a second bracket coupled to the second housing.

17. The ladder of claim 16 wherein the first locking assembly is coupled to the first bracket and includes a first knob, a first jaw, a second jaw, and a first connector, wherein the first jaw and the second jaw are connected via the first connector and movable with the first connector, and wherein the first jaw and the second jaw engage the first rail by passing through the at least two first engagement slots of the first housing, and wherein the second locking assembly is coupled to the second bracket includes a second knob, a third jaw, a fourth jaw, and a second connector, wherein the first jaw and the second jaw are connected via the second connector and movable with the second connector, and wherein the third jaw and the fourth jaw engage the second rail by passing through the at least two second engagement slots of the second housing.

18. The ladder of claim 17 wherein when the first locking assembly and the second locking assembly go from the unlocked position to the locked position, the first knob and the second knob are rotates which causes the first connector and the second connector to move towards the first knob and the second knob and cause the first jaw and the second jaw to clamp towards the first rail and the third jaw and the fourth jaw to clamp towards the second rail.

19. An accessory for a ladder rail with a rung comprising:

a first housing and a second housing, the first and second housings removably attachable to a respective first rail and a second rail, the first and second housings each including at least two engagement slots;

a first elongate member and a second elongate member coupled to and extending from the first and second housings and including at least two elongate slots corresponding to the at least two engagement slots of the first and second housings; and at least a first clamp and a second clamp, the first clamp and the second clamp each having a bracket and jaws rotatably coupled to the bracket.

20. The accessory of claim 19 further comprising a knob and a square nut, wherein the knob is threaded through the square nut, and the square nut contacts a portion of the jaws of the first clamp and the second clamp.

21. An accessory for a ladder rail with a rung comprising:

a housing removably attached to the ladder rail, the housing including at least two engagement slots;

an elongate member coupled to and extending from the housing and including at least two elongate slots corresponding to the at least two engagement slots of the housing; and a first locking assembly coupled to the housing, wherein the first locking assembly includes a locked position and an unlocked position, in the locked position the housing and the elongate member are held onto the rail, and in the unlocked position the housing and the elongate member is permitted to be removed from the rail, wherein a cross-section of the housing is rectangular shaped, wherein the housing is hollow and includes a perimeter which is greater than a perimeter of a cross-section of the rail such that the housing fits around an end of the rail.

22. An accessory for a ladder rail with a rung comprising:

a housing removably attached to the ladder rail, the housing including at least two engagement slots;

an elongate member coupled to and extending from the housing and including at least two elongate slots corresponding to the at least two engagement slots of the housing, wherein the elongate member comprises a first ladder grip for a walk through; and a first locking assembly coupled to the housing, wherein the first locking assembly includes a locked position and an unlocked position, in the locked position the housing and the elongate member are held onto the rail, and in the unlocked position the housing and the elongate member is permitted to be removed from the rail.

* * * * *